(12) United States Patent
Park et al.

(10) Patent No.: US 10,768,480 B2
(45) Date of Patent: Sep. 8, 2020

(54) BACKLIGHT UNIT AND LIQUID CRYSTAL DISPLAY DEVICE INCLUDING THE SAME

(71) Applicant: LG Display Co., Ltd., Seoul (KR)

(72) Inventors: Se-Hyun Park, Paju-si (KR); Min-Jae Kang, Paju-si (KR); Ji-Su Yoon, Paju-si (KR); Kyu-Hwan Lee, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 71 days.

(21) Appl. No.: 16/159,143

(22) Filed: Oct. 12, 2018

(65) Prior Publication Data

US 2019/0129250 A1 May 2, 2019

(30) Foreign Application Priority Data

Oct. 31, 2017 (KR) .................. 10-2017-0144064

(51) Int. Cl.
| | | |
|---|---|---|
| *G02F 1/13357* | (2006.01) | |
| *F21V 8/00* | (2006.01) | |
| *G02F 1/1335* | (2006.01) | |

(52) U.S. Cl.
CPC ..... *G02F 1/133606* (2013.01); *G02B 6/0026* (2013.01); *G02B 6/0056* (2013.01); *G02F 1/1336* (2013.01); *G02F 1/133514* (2013.01); *G02F 1/133608* (2013.01); *G02F 1/133605* (2013.01); *G02F 2001/133607* (2013.01); *G02F 2001/133614* (2013.01); *G02F 2201/34* (2013.01); *G02F 2202/28* (2013.01)

(58) Field of Classification Search
None
See application file for complete search history.

(56) References Cited

U.S. PATENT DOCUMENTS

| | | | |
|---|---|---|---|
| 2003/0214720 A1* | 11/2003 | Bourdelais | ........... G02B 5/0221 |
| | | | 359/599 |
| 2009/0059121 A1 | 3/2009 | Konno et al. | |
| 2011/0026124 A1* | 2/2011 | Kim | ..................... G02B 5/0242 |
| | | | 359/599 |
| 2012/0127697 A1* | 5/2012 | Kim | ........................ B32B 37/26 |
| | | | 362/97.2 |
| 2012/0147295 A1 | 6/2012 | Kasano et al. | |
| 2012/0147296 A1 | 6/2012 | Montgomery et al. | |
| 2013/0003415 A1 | 1/2013 | Park et al. | |
| 2015/0062490 A1 | 3/2015 | Kwon | |

(Continued)

FOREIGN PATENT DOCUMENTS

| | | |
|---|---|---|
| CN | 106200112 A | 12/2016 |
| EP | 3 457 201 A1 | 3/2019 |

(Continued)

*Primary Examiner* — Edward J Glick
*Assistant Examiner* — David Y Chung
(74) *Attorney, Agent, or Firm* — Seed IP Law Group LLP

(57) ABSTRACT

The present disclosure is directed to a liquid crystal display device including a display panel including a red pixel, a green pixel, and a blue pixel; and a backlight unit which emits light to the display panel. The backlight unit includes a light source which outputs a first color light; a color conversion layer which is configured to convert the first color light into a second color light; an optical sheet which diffuses or condenses the second color light; and an air gap formed between the color conversion layer and the optical sheet.

17 Claims, 11 Drawing Sheets

(56) References Cited

U.S. PATENT DOCUMENTS

| | | |
|---|---|---|
| 2015/0103151 A1 | 4/2015 | Carls et al. |
| 2015/0109814 A1 | 4/2015 | Chen et al. |
| 2015/0124188 A1 | 5/2015 | Kadowaki et al. |
| 2015/0260903 A1 | 9/2015 | Kashima et al. |
| 2015/0323728 A1 | 11/2015 | Lee et al. |
| 2016/0025921 A1 | 1/2016 | Park |
| 2016/0043288 A1 | 2/2016 | Chen et al. |
| 2016/0070137 A1 | 3/2016 | You et al. |
| 2016/0085109 A1 | 3/2016 | Baek et al. |
| 2016/0201858 A1 | 7/2016 | Kang et al. |
| 2016/0291231 A1 | 10/2016 | Jang et al. |
| 2016/0334564 A1* | 11/2016 | Cho ................. G02F 1/133606 |
| 2016/0377786 A1 | 12/2016 | Ham |
| 2017/0139100 A1 | 5/2017 | Nam et al. |
| 2017/0146859 A1* | 5/2017 | Lin ................... G02F 1/133621 |
| 2017/0153366 A1 | 6/2017 | Park et al. |
| 2017/0168351 A1 | 6/2017 | Qiu et al. |
| 2018/0017726 A1* | 1/2018 | Kim ..................... G02B 6/0065 |
| 2018/0039131 A1 | 2/2018 | Szwarcman et al. |
| 2018/0081105 A1* | 3/2018 | Harada ..................... F21V 9/40 |
| 2019/0004375 A1 | 1/2019 | Chang et al. |
| 2019/0086608 A1* | 3/2019 | Yoo ........................ G02B 6/005 |
| 2019/0094617 A1* | 3/2019 | Park .................. G02F 1/133603 |
| 2019/0129253 A1* | 5/2019 | Moon ............... G02F 1/133615 |
| 2019/0129254 A1* | 5/2019 | Moon .................... G02B 6/005 |
| 2020/0026124 A1* | 1/2020 | Kurogane ............. G02F 1/1339 |

FOREIGN PATENT DOCUMENTS

| | | |
|---|---|---|
| TW | 200739192 A | 10/2007 |
| TW | I503812 B | 10/2015 |
| TW | 201614342 A | 4/2016 |
| TW | I574430 B | 3/2017 |
| TW | I591071 B | 7/2017 |
| TW | 201736915 A | 10/2017 |
| TW | I642773 B | 12/2018 |

* cited by examiner

BACKLIGHT UNIT AND LIQUID CRYSTAL DISPLAY DEVICE INCLUDING THE SAME

CROSS-REFERENCE TO RELATED APPLICATIONS

This application claims the benefit under 35 U.S.C. § 119(a) of Korean Patent Application No. 2017-0144064, filed on Oct. 31, 2017, in the Korean Intellectual Property Office, which is incorporated herein by reference in its entirety.

BACKGROUND

Technical Field

The present disclosure relates to a backlight unit and a liquid crystal display device including the same.

Description of the Related Art

As an information-oriented society has developed, a variety of needs with respect to a display device for displaying an image have increased. Accordingly, recently, several flat panel display devices, such as a liquid crystal display (LCD) device, a plasma display panel (PDP), an organic electroluminescence display device, have been utilized. Among flat panel display devices, an LCD device displays an image by modulating light which is incident from a backlight unit, by controlling an electric field applied to a liquid crystal layer.

Backlight units of such LCDs may be classified into a direct light type backlight unit and an edge light type backlight unit depending on an arrangement of light sources. In a direct light type backlight unit, a plurality of light sources are arranged on a rear surface of an LCD panel and light emitted by the light sources is transmitted toward the LCD panel. On the other hand, in the edge light type backlight unit, a plurality of light sources are arranged on one side of a bottom of an LCD panel and light emitted by the light sources is transmitted toward the LCD panel by using a light guide plate.

For the light sources of the direct light type or edge light type backlight unit, white light, in which blue light, red light, and green light are mixed, is emitted toward the rear surface of the LCD panel or a side of the light guide plate. Here, the green light is generated by absorbing, by a green fluorescent material, the blue light, and the red light is generated by absorbing, by a red fluorescent material, the blue light.

Referring to FIG. 1, it may be seen that a part of a green light emitting area overlaps a red color absorption area. Due to such properties, since the red fluorescent material absorbs the green light as much as an area R in which the green light emitting area overlaps the red color absorption area, the green light is reduced. Accordingly, luminance of light is reduced.

BRIEF SUMMARY

Embodiments relate to a backlight unit capable of improving luminance of light and a liquid crystal display device including the backlight unit.

One or more embodiments relate to a liquid crystal display device including: a display panel including a red pixel, a green pixel, and a blue pixel; and a backlight unit which emits light to the display panel, wherein the backlight unit comprises: a light source which outputs a first color light; a color conversion layer which is disposed on the light source and converts the first color light into a second color light; an optical sheet which diffuses or condenses the second color light; and an air gap formed between the color conversion layer and the optical sheet.

One or more embodiments relate to a backlight unit including: a light source which outputs a first color light; a color conversion layer which is disposed on the light source and converts the first color light into a second color light; an optical sheet which diffuses or condenses the second color light; and an air gap formed between the color conversion layer and the optical sheet, wherein the first color comprises blue light, and the second color light comprises green light.

Advantages and features of the disclosure will be set forth in part in the description which follows and in part will become apparent to those having ordinary skill in the art upon examination of the following or may be learned from practice of the disclosure. Other advantages and features of the embodiments herein may be realized and attained by the structure particularly pointed out in the written description and claims hereof as well as the appended drawings.

It is to be understood that both the foregoing general description and the following detailed description are explanatory and are intended to provide further explanation of the embodiments as claimed.

BRIEF DESCRIPTION OF THE SEVERAL VIEWS OF THE DRAWINGS

The accompanying drawings, which are included to provide a further understanding of the disclosure, are incorporated in and constitute a part of this specification, illustrate implementations of the disclosure and together with the description serve to explain the principles of embodiments of the disclosure.

DETAILED DESCRIPTION

Figure 1:
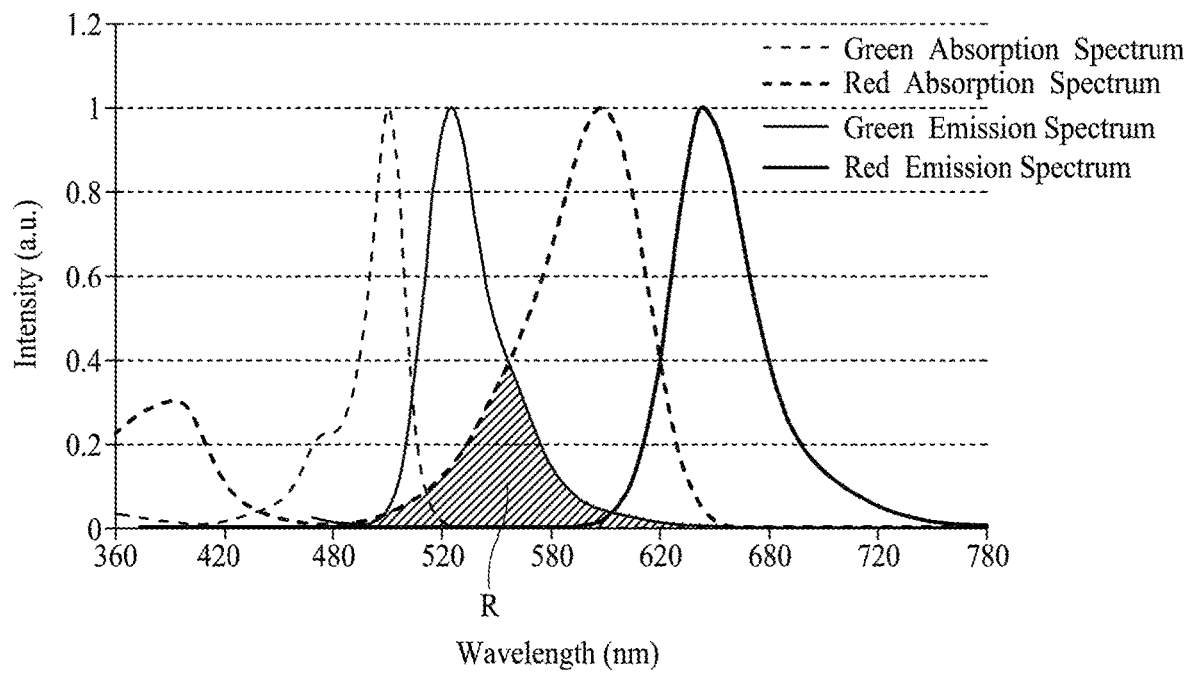
FIG. 1 is a graph illustrating absorption spectrums and luminescence spectrums with respect to red and green colors according to the related art.

Hereinafter, embodiments of the present disclosure will be described in detail with reference to the attached drawings.

Advantages and features of the present disclosure and a method of achieving the same will become apparent with reference to the attached drawings and the embodiments which are described below in detail. However, the present disclosure is not limited to the embodiments described below and may be embodied with a variety of different modifications. The embodiments are merely provided to allow one of ordinary skill in the art to completely understand the scope of the present disclosure.

Shapes, sizes, ratios, angles, numbers, and the like shown in the drawings to explain the embodiments of the present disclosure are merely examples, and the present disclosure is not limited to the shown in the drawings. Throughout the specification, like reference numerals refer to like elements. In the description of the embodiments of the present disclosure, a detailed description of a well-known technology of the related art will be omitted when it is deemed to obscure the essence of the present disclosure.

When "comprise," "have," "include," and the like are stated herein, another parts may be added unless "only" is used. Singular expressions of components, unless particularly defined otherwise, include plural expressions thereof.

A component is interpreted as including an error range even through an additional explicit statement thereof is not present.

In a description on a position relationship, when a position relationship between two parts is described as, for example, "on," "above," "below," "beside," and the like, one or more other parts may be located between the two parts unless "just" or "directly" is used.

In a description on a time relationship, when a temporal order relationship is described as, for example, "after," "next to," "and then," "before," and the like, cases occurring at different times may also be included unless "just" or "directly" is used.

Terms such as first, second, and the like are used for describing a variety of components. However, the components will not be limited by the terms. The terms are used merely for distinguishing one component from others. Accordingly, a first component stated below may be a second component within the technical concept of the present disclosure.

A relationship among "x-axis direction," "y-axis direction," and "z-axis direction" should not be interpreted as a perpendicularly formed geometrical relationship and may mean having directionality wider than a functionally operable range of a component in the present disclosure.

The term "at least one" should be understood as including any combination of one or more related items. For example, "at least one of a first item, a second item, and a third item" may mean not only each of the first item, the second item, and the third item but also any combinations of all items from two or more of the first item, the second item, and the third item.

Features of a variety of embodiments of the present disclosure may be partially or entirely combined or mixed with one another and may perform technically diverse interconnection and drive, and the embodiments may be independently performed from one another or may be performed together in a correlation.

Hereinafter, exemplary embodiments of the present disclosure will be described in detail with reference to the attached drawings.

Figure 2:
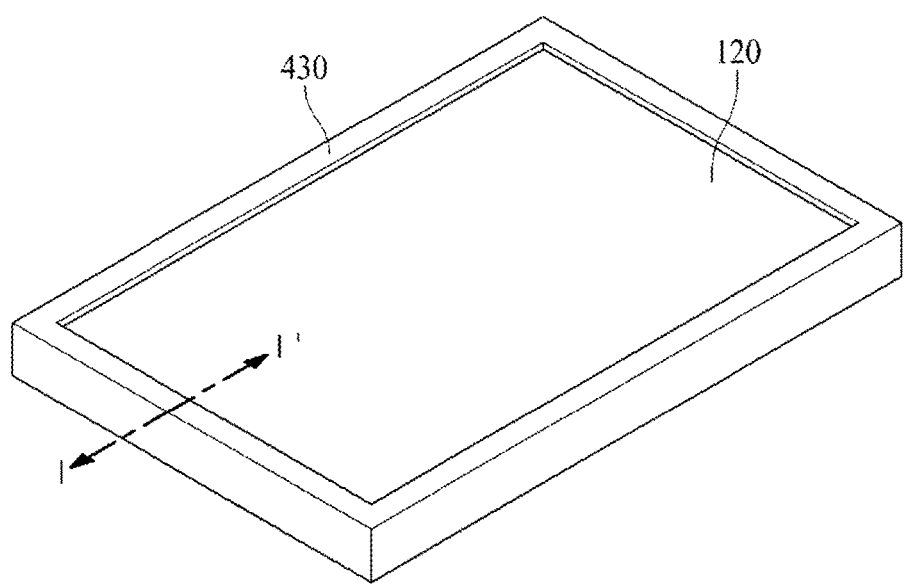
FIG. 2 is a perspective view of a liquid crystal display device according to an embodiment of the present disclosure.
Figure 3:
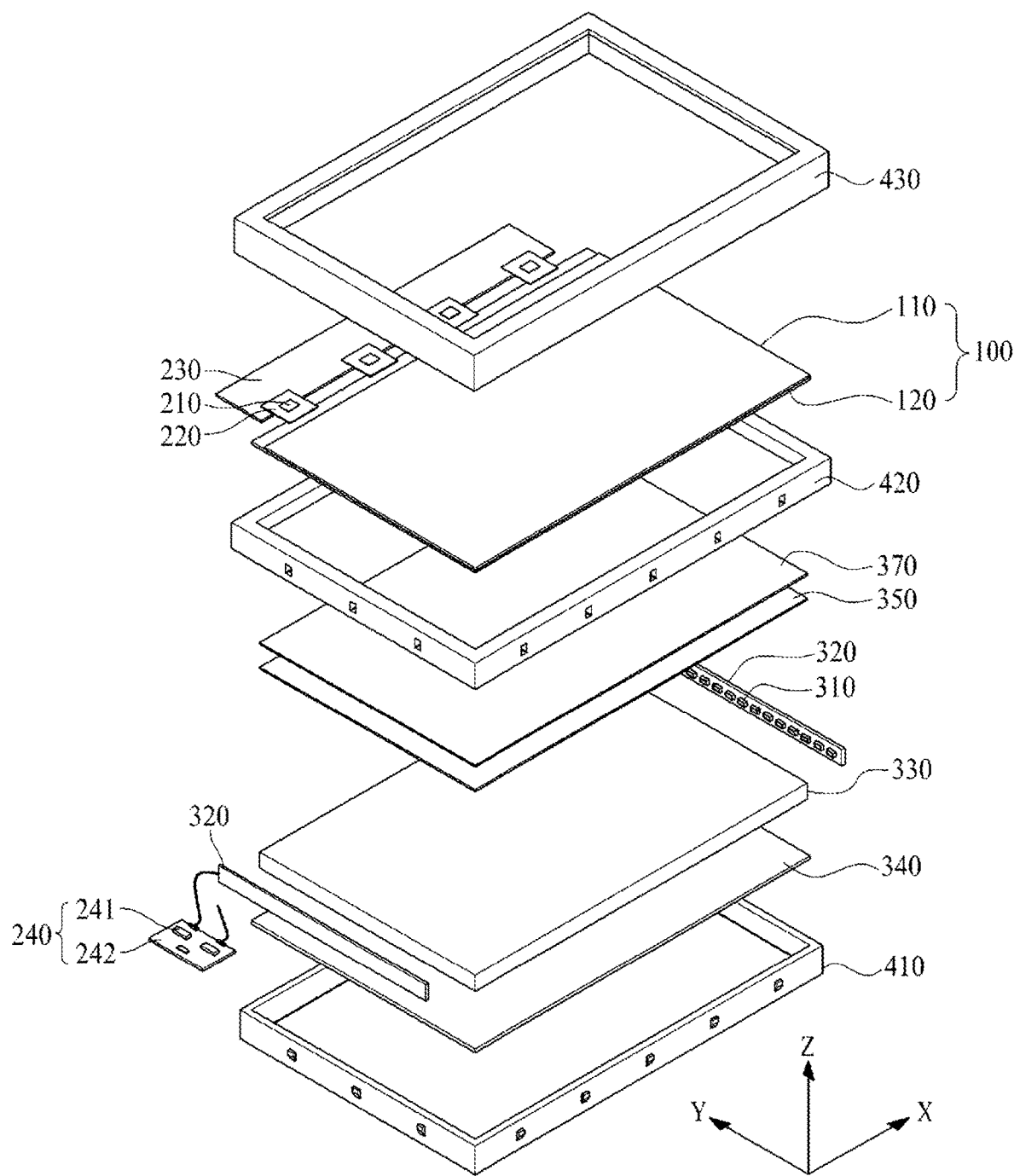
FIG. 3 is an exploded perspective view of the liquid crystal display device of FIG. 2.
Figure 4:
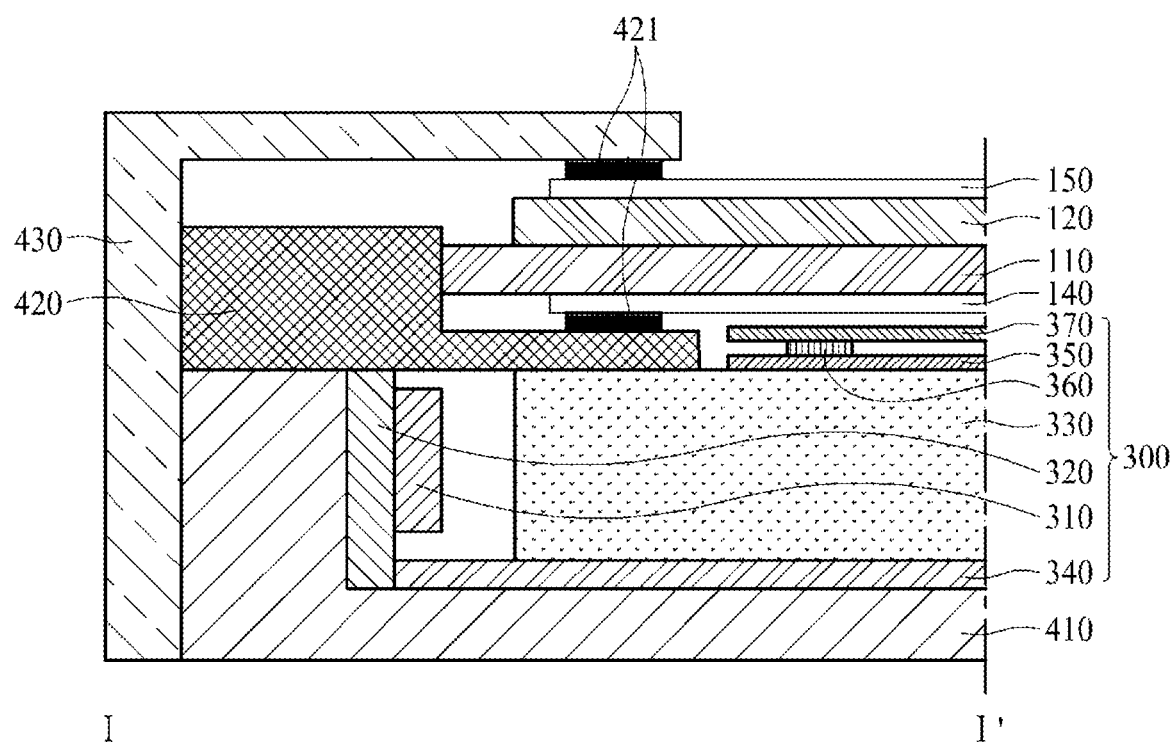
FIG. 4 is a cross-sectional view taken along a line I-I' in FIG. 2.

FIG. 2 is a perspective view of a liquid crystal display device according to one embodiment of the present disclosure. FIG. 3 is an exploded perspective view of the liquid crystal display device of FIG. 2. FIG. 4 is a cross-sectional view taken along a line I-I' in FIG. 2.

Referring to FIGS. 2 to 4, the liquid crystal display device according to one embodiment of the present disclosure includes a display panel 100, a drive circuit portion for driving the display panel 100, a backlight unit 300, and a case member.

The display panel 100 includes a lower substrate 110, an upper substrate 120, and a liquid crystal layer interposed between the lower substrate 110 and the upper substrate 120. The lower substrate 110 and the upper substrate 120 may be formed of glass or plastic.

The lower substrate 110 may have a size larger than a size of the upper substrate 120.

Accordingly, flexible source films 220 may be attached to an edge of one side of a top surface of the lower substrate 110 which is not covered by the upper substrate 120. The top surface of the lower substrate 110 corresponds to a surface which faces the upper substrate 120.

Signal lines and pixels are provided on the top surface of the lower substrate 110 of the display panel 100. The signal lines may include data lines and gate lines which overlap one another, a common line for supplying a common voltage to common electrodes, and gate control signal lines through which gate control signals are supplied as control signals to a gate drive circuit. Pixels may be arranged in an intersection or overlap area between the data lines and the gate lines. Each of the pixels includes a thin film transistor (TFT), a pixel electrode, and a common electrode. The TFT supplies a data voltage of the data line to the pixel electrode in response to receiving a gate signal of the gate line.

Liquid crystals of the liquid crystal layer are aligned by an electric field generated by a potential difference between the data voltage supplied to the pixel electrode and the common voltage supplied to the common electrode such that a transmission amount of light, which is incident from the backlight unit, may be adjusted.

A black matrix and a color filter may be provided on a bottom surface of the upper substrate 120 of the display panel 100. The bottom surface of the upper substrate 120 corresponds to a surface which faces the lower substrate 110. However, when the display panel 100 is formed using a color filter on TFT array (COT), the black matrix and the color filter may be provided on the top surface of the lower substrate 110.

The common electrode may be provided on the bottom surface of the upper substrate 120 in a perpendicular electric field drive method such as a twisted nematic (TN) mode and a vertical alignment (VA) mode or may be provided on the top surface of the lower substrate 110 in a horizontal electric field drive method such as an in plane switching (IPS) mode and a fringe field switching (FFS) mode.

The black matrix includes a light-barrier material formed in a matrix structure so as to prevent light from leaking into areas except a pixel area.

The color filter is formed in the pixel area between the black matrixes. The color filter includes a red color filter, a green color filter, and a blue color filter.

An upper polarizing plate 150 is attached to the upper substrate 120 of the display panel 100, and a lower polarizing plate 140 is attached to the lower substrate 110. A light transmission axis of the upper polarizing plate 150 intersects with or crosses a light transmission axis of the lower polarizing plate 140. Also, an alignment film for setting a pre-tilt angle of liquid crystals may be formed on inner sides of the upper substrate 120 and the lower substrate 110 which are in contact with the liquid crystals.

The drive circuit portion includes the gate drive circuit, source drive circuits 210, the flexible source films 220, a circuit board 230, and a light source drive portion 240.

The gate drive circuit supplies the gate signals to the gate lines of the lower substrate 110. The gate drive circuit may be formed directly on the top surface of the lower substrate 110 by using a gate driver in panel (GIP) method. Otherwise, when the gate drive circuit is embodied as a drive chip, the gate driving circuit may be mounted on a flexible gate film by using a chip on film (COF) method, and the flexible gate films may be attached to the edge of the top surface of the lower substrate 110 which is not covered by the upper substrate 120.

The source drive circuits 210 supply the data voltages to the data lines of the lower substrate 110. When each of the source drive circuits 210 is embodied as a drive chip, each of the source drive circuits 210 may be mounted on the flexible source film 220 by using a COF method. Otherwise, the source drive circuits 210 may adhere to the top surface of the lower substrate 110 by using a chip on glass (COG) method or a chip on plastic (COP) method. The flexible source films 220 may be attached to the edge of the one side of the top surface of the lower substrate 110 which are not covered by the upper substrate 120 and the circuit board 230. The circuit board 230 may be embodied as a printed circuit board (PCB).

The light source drive portion 240 includes a light source drive circuit 241 and a light source circuit board 242.

The light source drive circuit 241 supplies drive currents to light sources 310 to allow the light sources 310 to emit light. The light source drive circuit 241 may be mounted on the light source circuit board 242. Otherwise, the light source drive circuit 241 may be mounted on the circuit board 230. In this case, the light source circuit board 242 may be omitted.

The drive circuit portion may further include a timing control circuit and a control circuit board on which the timing control circuit is mounted. In this case, the control circuit board may be connected to the circuit board 230 through a certain flexible cable.

The backlight unit 300 includes a plurality of such light sources 310, a light source circuit board 320, a light guide plate 330, a reflection sheet 340, optical sheets 370, and the like. The backlight unit 300 converts light from the light sources 310 into a uniform planar light source through the light guide plate 330 and the optical sheets 370 and emits light toward the display panel 100. Although the backlight unit is described with reference to FIGS. 3 and 4 as being embodied as an edge light type backlight unit, it should be noted that the backlight unit is not limited thereto and may be embodied as a direct light type backlight unit.

The light sources 310 may be embodied as light emitting diodes (LEDs). Here, the LEDs may include at least one of a blue LED which outputs blue light, a red LED which outputs red light, and a magenta LED which outputs magenta light in which blue light and red light are mixed.

The light sources 310 are arranged on at least one side surface of the light guide plate 330 and emit light toward the side surface of the light guide plate 330. The light sources 310 are mounted on the light source circuit board 320 and turned on or off by receiving drive currents of the light source drive circuit 241. The light source circuit board 320 is connected to the light source drive portion 240.

The light guide plate 330 converts light from the light sources 310 into a surface light source and emits the light toward the display panel 100. The reflection sheet 340 is disposed on a bottom surface of the light guide plate 330 and reflects light, which moves from the light guide plate 330 toward the below of the light guide plate 330, toward the light guide plate 330.

Optical sheets 370 are disposed between the light guide plate 330 and the display panel 100. That is, the optical sheets 370 are disposed below the display panel 100, and the light guide plate 330 is disposed below the optical sheets 370. The optical sheets 370 include one or more prism sheets or one or more diffusion sheets, diffuses light which is incident from the light guide plate 330, and refracts a progression path of light to allow the light to be incident on a light-incident surface of the display panel 100 at a substantially perpendicular angle. Also, the optical sheets 370 may include a dual brightness enhancement film (DBEF). For example, the optical sheets 370 may include a diffusion sheet, a prism sheet, and a DBEF. In this case, an uppermost optical sheet may be a DBEF.

A color conversion layer 350 is disposed on the light guide plate 330 and converts blue light or magenta light which is incident from the light sources 310 through the light guide plate 330 into white light. The color conversion layer 350 according to the embodiment may also include a green color conversion layer which converts blue light or magenta light into green light.

An adhesive layer 360 is disposed between the color conversion layer 350 and the optical sheets 370. The adhesive layer 360 allows the color conversion layer 350 and the optical sheets 370 to adhere to each other and forms an air gap between the color conversion layer 350 and the optical sheets 370. A detailed description of the color conversion layer 350 and the adhesive layer 360 will be described below with reference to FIGS. 5 to 11.

The case member includes a bottom cover 410, a support frame 420, and a top case 430.

The bottom cover 410 is manufactured as a square metal frame and surrounds side surface and a bottom surface of the backlight unit 300 as shown in FIG. 4. The bottom cover 410 may be manufactured using a high strength steel plate, for example, an electro galvanized iron (EGI) plate, a stainless steel (SUS) plate, a galvarium (SGLC) steel sheet, an aluminum-plated steel sheet (ALCOSTA), a tin-plated steel sheet (SPTE), or the like.

The support frame 420 supports a bottom surface of the lower substrate 110 of the display panel 100. The support frame 420 is sometimes referred to as a guide panel, a guide frame, or the like. The support frame 420 may be fixedly combined with the bottom cover 410 by using a fixing member. The support frame 420 may be manufactured as a square frame formed of glass fibers mixed in a synthetic resin such as polycarbonate and the like or may be manufactured using an SUS. In addition, a buffering member 421 may be provided between the lower substrate 110 and the support frame 420 as shown in FIG. 4 to protect the lower substrate 110 of the display panel 100 from being shocked by the support frame 420.

The top case 430 surrounds edges of the display panel 100, a top surface and a side surface of the support frame 420, and a side surface of the bottom cover 410. The top case 430 may be manufactured using, for example, an EGI plate, SUS, or the like. The top case 430 may be fixed to the support frame 420 by using, for example, a hook or a screw. In addition, the buffering member 421 may be provided between the upper substrate 120 and the top case 430 as shown in FIG. 4 to protect the upper substrate 120 of the display panel 100 from being shocked by the top case 430.

First Embodiment

Figure 5:
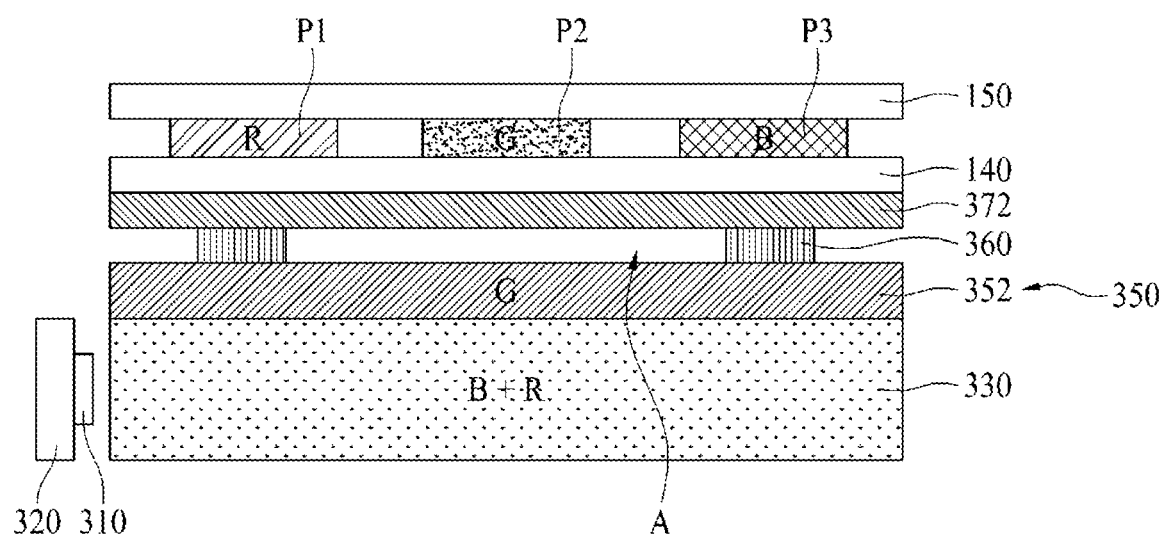
FIG. 5 is a schematic cross-sectional view showing a color conversion layer and an adhesive layer according to a first embodiment of the present disclosure.

FIG. 5 is a schematic cross-sectional view illustrating a first embodiment of the color conversion layer and the adhesive layer.

Referring to FIG. 5, a liquid crystal display device includes the display panel 100 and the backlight unit 300.

The backlight unit 300 includes the light sources 310, the light guide plate 330, a green color conversion layer 352, the adhesive layer 360, and a prism sheet 372.

The light sources 310 may include a blue LED which emits blue light and a red LED which emits red light or may include a magenta LED which emits magenta light in which blue light and red light are mixed. The light sources 310 are arranged on at least one side surface of the light guide plate 330 and emit light toward the side surface of the light guide plate 330.

The light guide plate 330 converts light emitted from the light sources 310 into a surface light source and emits the light toward the display panel 100. In the first embodiment of the present disclosure, on the light guide plate 330, blue light may be incident from the blue LED and red light may be incident from the red LED. Here, the blue light and the red light may be mixed in the light guide plate 330 and become the magenta light. In addition, on the light guide plate 330, magenta light may be incident from the magenta LED.

Accordingly, the light guide plate 330 allows the magenta light to proceed toward the display panel 100. The green color conversion layer 352 is formed on the light guide plate 330 to overlap a plurality of pixels P1, P2, and P3. The green color conversion layer 352 is disposed on a path of light which proceeds toward the display panel 100 from the light guide plate 330 and converts the magenta light emitted by the light guide plate 330 into white light. In more detail, the green color conversion layer 352 includes a green light emitting material. The green light emitting material included in the green color conversion layer 352 collides with a part of the blue light included in the magenta light and absorbs energy of the blue light. Accordingly, a wavelength of the part of the blue light is changed into that of green light, and blue light, red light and green light which have passed through the green color conversion layer 352 are mixed with each other and converted into white light.

The above-described green light emitting material includes, for example, a green phosphorescent material or a green fluorescent material and is mixed with a transparent resin material, such as a silicone resin, to form the green color conversion layer 352. The prism sheet 372 condenses light, which is incident thereon, in a first direction. Here, the first direction may correspond to a major axis direction or a minor axis direction of the light guide plate 330.

The adhesive layer 360 is disposed between the green color conversion layer 352 and the prism sheet 372. The adhesive layer 360 is formed on a portion of a top surface of the green color conversion layer 352 so as to allow the prism sheet 372 to adhere to the green color conversion layer 352 simultaneously while forming an air gap A between the green color conversion layer 352 and the prism sheet 372. Here, the adhesive layer 360 is formed to not overlap a green (G) pixel P2 such that the green light generated by the green color conversion layer 352 proceeds toward the G pixel P2 without luminance reduction. That is, the adhesive layer 360 is formed to overlap a red (R) pixel P1 and a blue (B) pixel P3 as shown in FIG. 5.

The display panel 100 includes the lower polarizing plate 140, the upper polarizing plate 150, and a plurality of such pixels P1, P2, and P3.

The lower polarizing plate 140 is disposed on a bottom surface of the lower substrate 110 and transmits light as linear polarized light. The upper polarizing plate 150 is disposed on a top surface of the upper substrate 120 such that transmission axes of the upper polarizing plate 150 and the lower polarizing plate 140 intersect or cross each other. The upper polarizing plate 150 transmits light as linear polarized light.

The plurality of pixels P1, P2, and P3 are formed between the lower substrate 110 and the upper substrate 120 and include the R pixel P1 which includes a red color filter, the G pixel P2 which includes a green color filter, and the B pixel P3 which includes a blue color filter.

The red color filter includes a red color component which transmits light having a red wavelength and absorbs light having other wavelengths. The green color filter includes a green color component which transmits light having a green wavelength and absorbs light having other wavelengths. The blue color filter includes a blue color component which transmits light having a blue wavelength and absorbs light having other wavelengths.

Accordingly, in the R pixel P1, as the white light generated by the green color conversion layer 352 passes through the red color filter, blue light and green light are absorbed and red light is emitted. In the G pixel P2, as the white light generated by the green color conversion layer 352 passes through the green color filter, blue light and red light are absorbed and green light is emitted. In the B pixel P3, as the white light generated by the green color conversion layer 352 passes through the blue color filter, red light and green light are absorbed and blue light is emitted.

Figure 12:
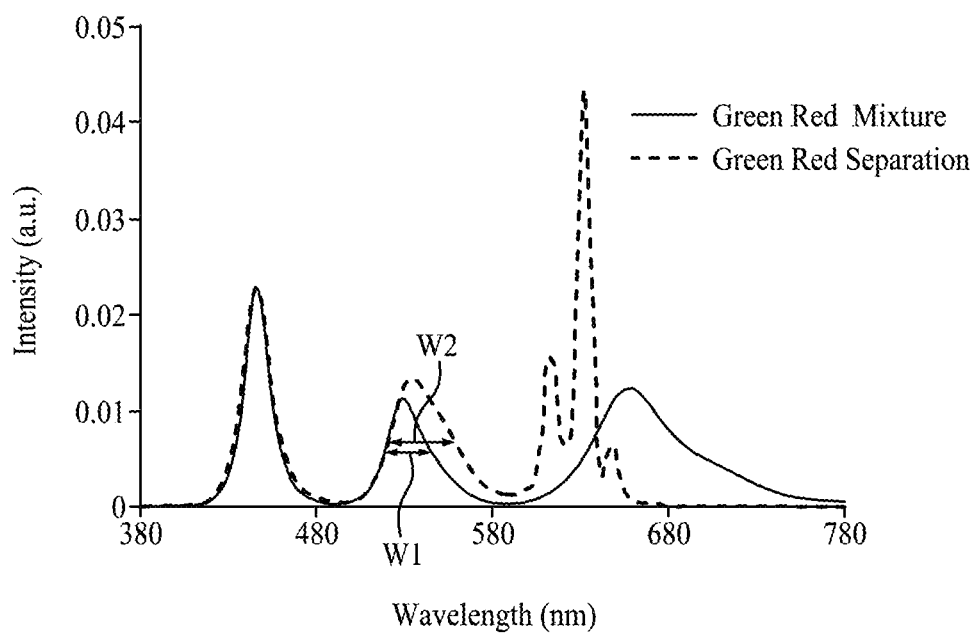
FIG. 12 is a graph illustrating an increase in luminance of a configuration in which red light and green light are spatially separated according to an embodiment of the present disclosure.

In the liquid crystal display device according to the first embodiment of the present disclosure, blue light and red light are emitted by the light sources 310 and green light is generated by the green color conversion layer 352. That is, since the red light and the green light are spatially separated and the red light is generated first and then the green light is generated, the liquid crystal display device prevents a red light emitting material from absorbing the green light. Accordingly, in the liquid crystal display device according to the first embodiment of the present disclosure, the green light increases and a half width of a green peak increases as shown in FIG. 12 such that luminance of light may be expected to increase.

Also, the liquid crystal display device according to the first embodiment of the present disclosure may prevent a light-condensing function of the prism sheet 372 from being degraded by a scattering property caused by the green light emitting material of the green color conversion layer 352 by forming the air gap A between the green color conversion layer 352 and the prism sheet 372. This will be described below in detail with reference to FIGS. 13 to 15.

In addition, although it is assumed in FIG. 5 that the liquid crystal display device includes an edge light type backlight unit, the present disclosure is not limited thereto. In other embodiments, a liquid crystal display device may include a direct light type backlight unit. In this case, light sources of the liquid crystal display device may be arranged below a green color conversion layer.

Second Embodiment

Figure 6:
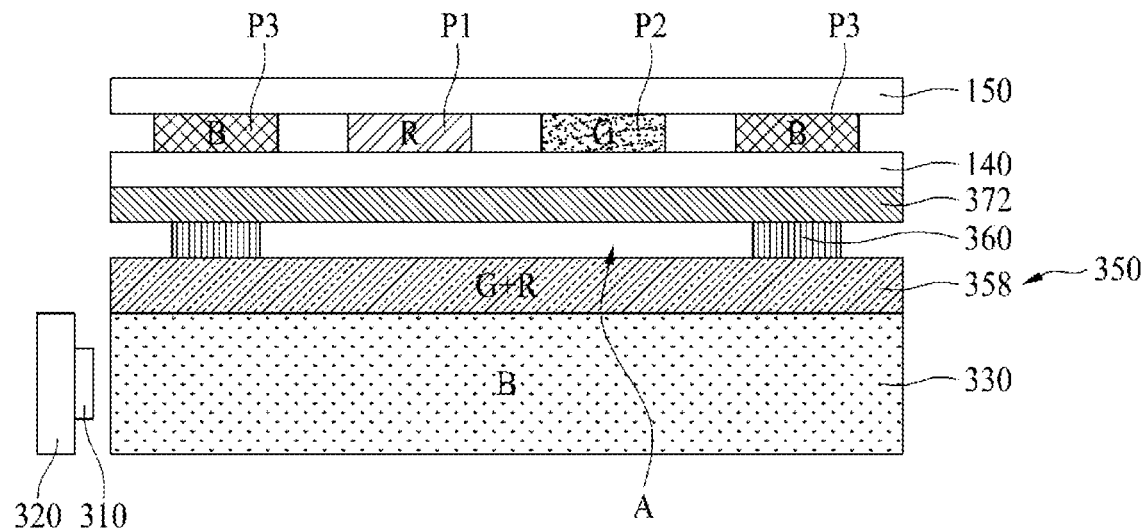
FIG. 6 is a schematic cross-sectional view showing a color conversion layer and an adhesive layer according to a second embodiment of the present disclosure.

FIG. 6 is a schematic cross-sectional view illustrating a second embodiment of the color conversion layer and the adhesive layer.

Referring to FIG. 6, a liquid crystal display device includes the display panel 100 and the backlight unit 300.

The backlight unit 300 includes the light sources 310, the light guide plate 330, a mixed color conversion layer 358, the adhesive layer 360, and the prism sheet 372.

The light sources 310 may include a blue LED which emits blue light. The light sources 310 are arranged on at least one side surface of the light guide plate 330 and emit light toward the side surface of the light guide plate 330.

The light guide plate 330 converts light emitted from the light sources 310 into a surface light source and emits the light toward the display panel 100. In the second embodiment of the present disclosure, on the light guide plate 330, blue light may be incident from the blue LED. Accordingly, the light guide plate 330 allows the blue light to proceed toward the display panel 100.

The mixed color conversion layer 358 is formed on the light guide plate 330 to overlap a plurality of pixels P1, P2, and P3. The mixed color conversion layer 358 is disposed on a path of light which proceeds toward the display panel 100 from the light guide plate 330 and converts the blue light emitted by the light guide plate 330 into white light. In more detail, the mixed color conversion layer 358 includes a red light emitting material and a green light emitting material. The red light emitting material included in the mixed color conversion layer 358 collides with a part of the blue light included and absorbs energy of the blue light. Accordingly, a wavelength of the part of the blue light is changed into that of the red light. Also, the green light emitting material included in the mixed color conversion layer 358 collides with a part of the blue light and absorbs energy of the blue light. Accordingly, a wavelength of the part of the blue light is changed into that of the green light. When light passes through the mixed color conversion layer 358, blue light, red light, and green light are mixed and converted into white light.

The above-described red light emitting material includes, for example, a red phosphorescent material or a red fluorescent material and is mixed with a transparent resin material such as a silicone resin to form the mixed color conversion layer 358. The above-described green light emitting material includes, for example, a green phosphorescent material or a green fluorescent material and is mixed with a transparent resin material such as a silicone resin to form the mixed color conversion layer 358. The prism sheet 372 condenses white light, which is incident thereon, in a first direction. Here, the first direction may correspond to a major axis direction or a minor axis direction of the light guide plate 330.

The adhesive layer 360 is disposed between the mixed color conversion layer 358 and the prism sheet 372. The adhesive layer 360 is formed on a portion of a top surface of the mixed color conversion layer 358 so as to allow the prism sheet 372 to adhere to the mixed color conversion layer 358 simultaneously while forming an air gap A between the mixed color conversion layer 358 and the prism sheet 372.

Here, the adhesive layer 360 is formed to not overlap an R pixel P1 and a G pixel P2 such that the red light and the green light generated by the mixed color conversion layer 358 to proceed to the R pixel P1 and the G pixel P2 without luminance reduction.

That is, the adhesive layer 360 is formed to overlap a B pixel P3 as shown in FIG. 6.

The display panel 100 includes the lower polarizing plate 140, the upper polarizing plate 150, and the plurality of pixels P1, P2, and P3.

The lower polarizing plate 140 is disposed on a bottom surface of the lower substrate 110 and transmits light as linear polarized light. The upper polarizing plate 150 is disposed on a top surface of the upper substrate 120 such that transmission axes of the upper polarizing plate 150 and the lower polarizing plate 140 intersect or cross each other. The upper polarizing plate 150 transmits light as linear polarized light.

The plurality of pixels P1, P2, and P3 are formed between the lower substrate 110 and the upper substrate 120 and include the R pixel P1 which includes a red color filter, the G pixel P2 which includes a green color filter, and the B pixel P3 which includes a blue color filter.

In the R pixel P1, as the white light generated by the mixed color conversion layer 358 passes through the red color filter, blue light and green light are absorbed and red light is emitted. In the G pixel P2, as the white light generated by the mixed color conversion layer 358 passes through the green color filter, blue light and red light are absorbed and green light is emitted. In the B pixel P3, as the white light generated by the mixed color conversion layer 358 passes through the blue color filter, red light and green light are absorbed and blue light is emitted.

The liquid crystal display device according to the second embodiment of the present disclosure may prevent a light-condensing function of the prism sheet 372 from being degraded by a scattering property caused by the red light emitting material and the green light emitting material of the mixed color conversion layer 358 by forming the air gap A between the mixed color conversion layer 358 and the prism sheet 372.

In addition, although it is assumed in FIG. 6 that the liquid crystal display device includes an edge light type backlight unit, the present disclosure is not limited thereto. In other embodiments, a liquid crystal display device may include a direct light type backlight unit. In this case, light sources of the liquid crystal display device may be arranged below a mixed color conversion layer.

Third Embodiment

Figure 7:
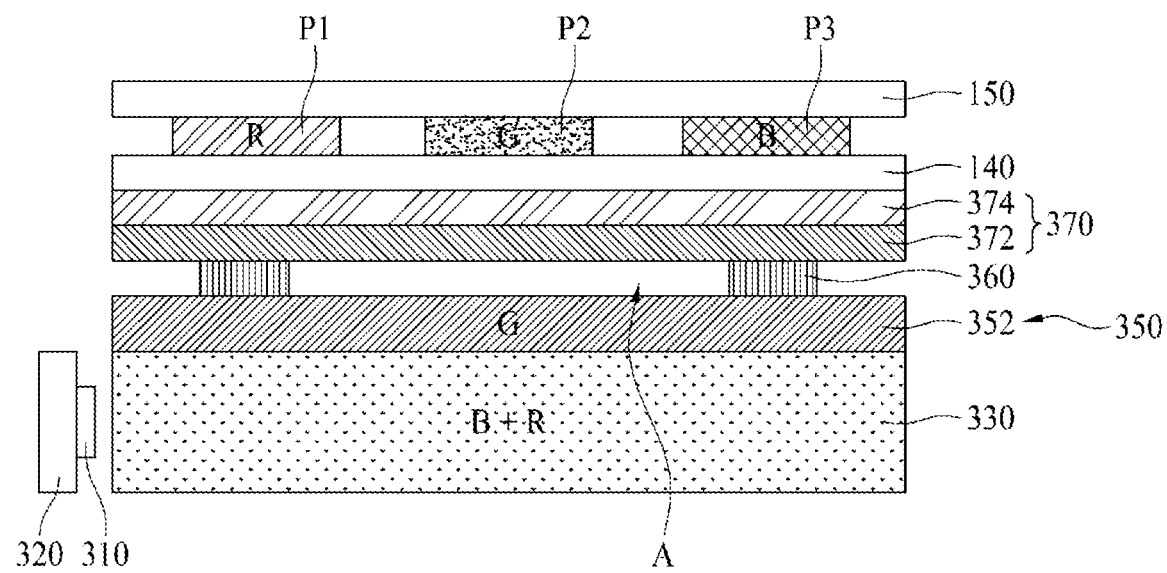
FIG. 7 is a schematic cross-sectional view showing a color conversion layer and an adhesive layer according to a third embodiment of the present disclosure.

FIG. 7 is a schematic cross-sectional view illustrating a third embodiment of the color conversion layer and the adhesive layer. In FIG. 7, the liquid crystal display device shown in FIG. 5 may further include a diffusion sheet 374. The diffusion sheet 374 is disposed on the prism sheet 372 and diffuses light which is incident thereto.

Since other components are substantially similar to those of FIG. 5, a description thereof will be omitted.

Fourth Embodiment

Figure 8:
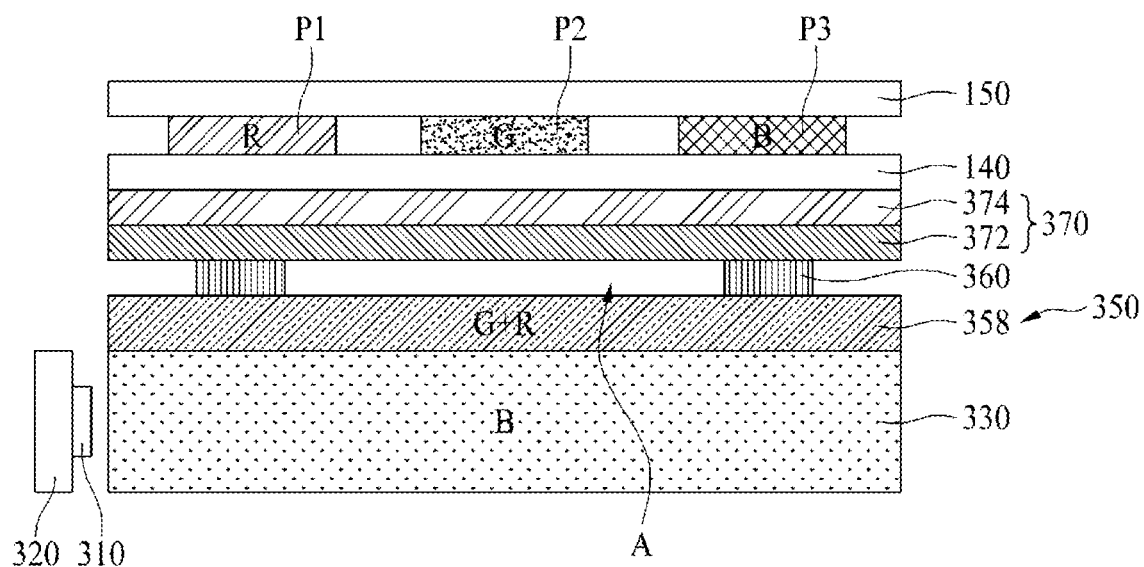
FIG. 8 is a schematic cross-sectional view showing a color conversion layer and an adhesive layer according to a fourth embodiment of the present disclosure.

FIG. 8 is a schematic cross-sectional view illustrating a fourth embodiment of the color conversion layer and the adhesive layer. In FIG. 8, the liquid crystal display device shown in FIG. 6 may further include the diffusion sheet 374. The diffusion sheet 374 is disposed on the prism sheet 372 and diffuses light which is incident thereon.

Since other components are substantially similar to those of FIG. 6, a description thereof will be omitted.

Fifth Embodiment

Figure 9:
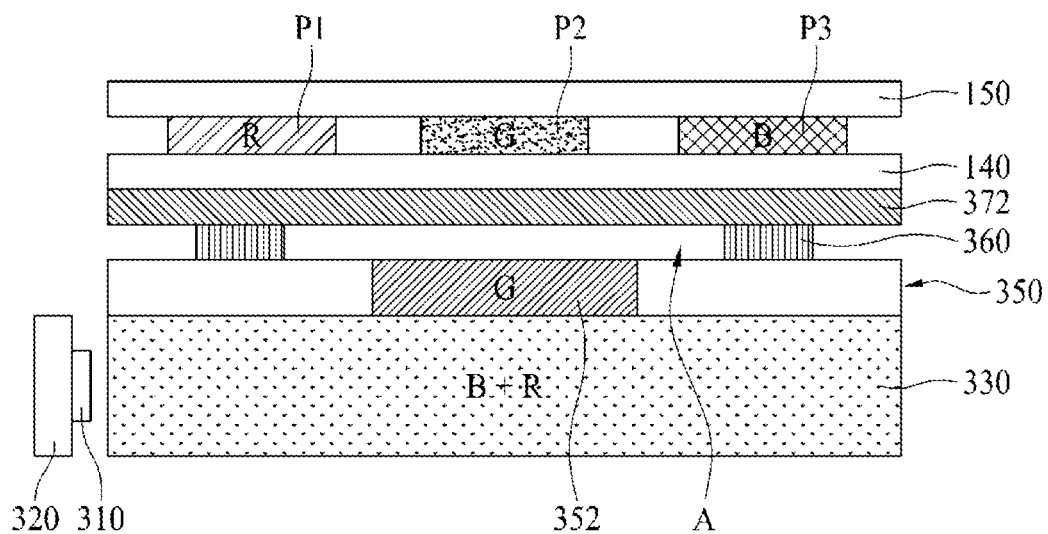
FIG. 9 is a schematic cross-sectional view showing a color conversion layer and an adhesive layer according to a fifth embodiment of the present disclosure.

FIG. 9 is a schematic cross-sectional view illustrating a fifth embodiment of the color conversion layer and the adhesive layer.

Referring to FIG. 9, a liquid crystal display device includes the display panel 100 and the backlight unit 300.

The backlight unit 300 includes the light sources 310, the light guide plate 330, the green color conversion layer 352, the adhesive layer 360, and the prism sheet 372.

The light sources 310 may include a blue LED which emits blue light and a red LED which emits red light or may include a magenta LED which emits magenta light in which blue light and red light are mixed. The light sources 310 are arranged on at least one side surface of the light guide plate 330 and emit light toward the side surface of the light guide plate 330.

The light guide plate 330 converts light emitted from the light sources 310 into a surface light source and emits the light toward the display panel 100. In the fifth embodiment of the present disclosure, on the light guide plate 330, blue light may be incident from the blue LED and red light may be incident from the red LED. Here, the blue light and the red light may be mixed in the light guide plate 330 and become magenta light. In addition, on the light guide plate 330, magenta light may be incident from the magenta LED. Accordingly, the light guide plate 330 allows the magenta light to proceed toward the display panel 100.

The color conversion layer 350 includes a green color conversion layer 352 and some transparent portions next to the green color conversion layer 352. The green color conversion layer 352 is formed on the light guide plate 330 to overlap a G pixel P2. The green color conversion layer 352 is disposed on a path of light which proceeds toward the display panel 100 from the light guide plate 330 and converts the magenta light emitted by the light guide plate 330 into white light. In more detail, the green color conversion layer 352 includes a green light emitting material. The green light emitting material included in the green color conversion layer 352 collides with a part of the blue light included in the magenta light and absorbs energy of the blue light. Accordingly, a wavelength of the part of the blue light is changed into that of green light, and blue light, red light and green light which have passed through the green color conversion layer 352 are mixed with each other and converted into white light.

The above-described green light emitting material includes, for example, a green phosphorescent material or a green fluorescent material and is mixed with a transparent resin material such as a silicone resin to form the green color conversion layer 352. The prism sheet 372 condenses light, which is incident thereon, in a first direction. Here, the first direction may correspond to a major axis direction or a minor axis direction of the light guide plate 330.

The adhesive layer 360 is disposed between the color conversion layer 350 and the prism sheet 372. The adhesive layer 360 is formed on a portion of a top surface of the color conversion layer 350 so as to allow the prism sheet 372 to adhere to the green color conversion layer 352 simultaneously while forming an air gap A between the green color conversion layer 352 and the prism sheet 372. Here, the adhesive layer 360 is formed to not overlap the G pixel P2 such that the green light generated by the green color conversion layer 352 proceeds toward the G pixel P2 without luminance reduction. That is, the adhesive layer 360 is formed to overlap an R pixel P1 and a B pixel P3 as shown in FIG. 9.

The display panel 100 includes the lower polarizing plate 140, the upper polarizing plate 150, and the plurality of pixels P1, P2, and P3.

The lower polarizing plate 140 is disposed on a bottom surface of the lower substrate 110 and transmits light as linear polarized light. The upper polarizing plate 150 is disposed on a top surface of the upper substrate 120 such that transmission axes of the upper polarizing plate 150 and the lower polarizing plate 140 intersect each other or cross each other. The upper polarizing plate 150 transmits light as linear polarized light.

The plurality of pixels P1, P2, and P3 are formed between the lower substrate 110 and the upper substrate 120 and include the R pixel P1 which includes a red color filter, the G pixel P2 which includes a green color filter, and the B pixel P3 which includes a blue color filter.

In the R pixel P1, when the magenta light which is incident from the light guide plate 330 passes through the red color filter, blue light is absorbed and red light is emitted. In the G pixel P2, as the white light generated by the green color conversion layer 352 passes through the green color filter, the blue light and the red light are absorbed and the green light is emitted. In the B pixel P3, when the magenta light which is incident from the light guide plate 330 passes through the blue color filter, the red light is absorbed and the blue light is emitted.

In addition, although it is assumed in FIG. 9 that the liquid crystal display device includes an edge light type backlight unit, the present disclosure is not limited thereto. In other embodiments, a liquid crystal display device may include a direct light type backlight unit. In this case, light sources of the liquid crystal display device may be arranged below a green color conversion layer.

Sixth Embodiment

Figure 10:
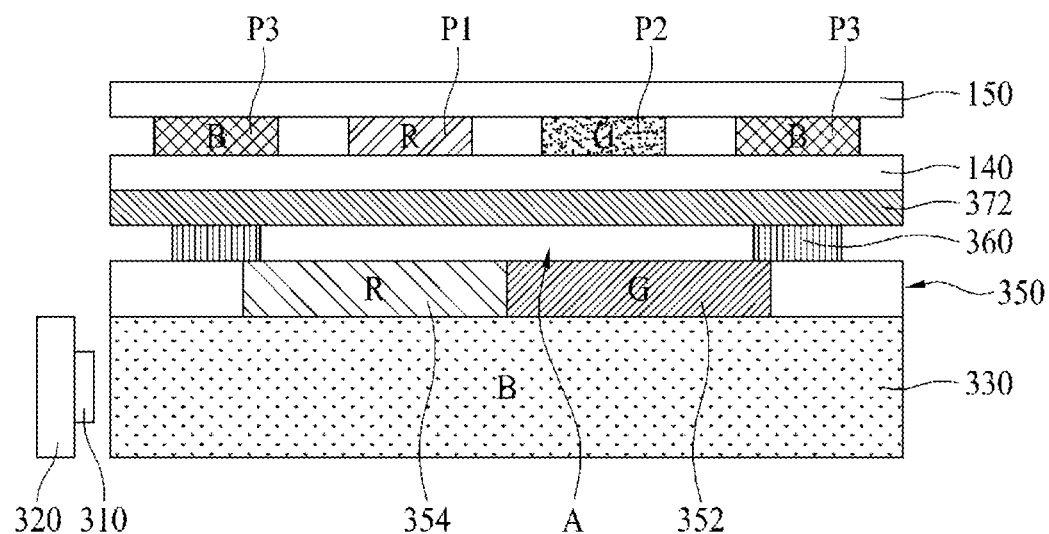
FIG. 10 is a schematic cross-sectional view showing a color conversion layer and an adhesive layer according to a sixth embodiment of the present disclosure.

FIG. 10 is a schematic cross-sectional view illustrating a sixth embodiment of the color conversion layer and the adhesive layer.

Referring to FIG. 10, a liquid crystal display device includes the display panel 100 and the backlight unit 300.

The backlight unit 300 includes the light sources 310, the light guide plate 330, the color conversion layer 350, the adhesive layer 360, and the prism sheet 372.

The light sources 310 may include blue LEDs which emit blue light. The light sources 310 are arranged on at least one side surface of the light guide plate 330 and emit light toward the side surface of the light guide plate 330.

The light guide plate 330 converts light emitted from the light sources 310 into a surface light source and emits the light toward the display panel 100. In the sixth embodiment of the present disclosure, on the light guide plate 330, the blue light may be incident from the blue LED. Accordingly, the light guide plate 330 allows the blue light to proceed toward the display panel 100.

The color conversion layer 350 is disposed between the light guide plate 330 and the display panel 100 and includes a red color conversion layer 354 and the green color conversion layer 352.

The red color conversion layer 354 is formed on the light guide plate 330 to overlap an R pixel P1. The red color conversion layer 354 is disposed on a path of light which proceeds toward the display panel 100 from the light guide plate 330 and converts the blue light emitted by the light guide plate 330 into magenta light. In more detail, the red color conversion layer 354 includes a red light emitting material. The red light emitting material included in the red color conversion layer 354 collides with a part of the blue light and absorbs energy of the blue light. Accordingly, a wavelength of the part of the blue light is changed into that of the red light, and blue light and red light which have passed through the red color conversion layer 354 are mixed with the each other and converted into magenta light.

The above-described red light emitting material includes, for example, a red phosphorescent material or a red fluorescent material and is mixed with a transparent resin material such as a silicone resin to form the red color conversion layer 354.

The green color conversion layer 352 is formed on the light guide plate 330 to overlap the G pixel P2. The green color conversion layer 352 is disposed on a path of light which proceeds toward the display panel 100 from the light guide plate 330 and converts the blue light emitted by the light guide plate 330 into cyan light. In more detail, the green color conversion layer 352 includes a green light emitting material. The green light emitting material included in the green color conversion layer 352 collides with a part of the blue light and absorbs energy of the blue light. Accordingly, a wavelength of the part of the blue light is changed into that of green light, and blue light and green light which have passed through the green color conversion layer 352 are mixed with each other and converted into cyan light.

The above-described green light emitting material includes, for example, a green phosphorescent material or a green fluorescent material and is mixed with a transparent resin material such as a silicone resin to form the green color conversion layer 352.

The prism sheet 372 condenses white light, which is incident thereon, in a first direction. Here, the first direction may correspond to a major axis direction or a minor axis direction of the light guide plate 330.

The adhesive layer 360 is disposed between the color conversion layer 350 and the prism sheet 372. The adhesive layer 360 is formed on a portion of a top surface of the color conversion layer 350 so as to allow the prism sheet 372 to adhere to the color conversion layer 350 simultaneously while forming an air gap A between the color conversion layer 350 and the prism sheet 372. Here, it the adhesive layer 360 is formed to not overlap the G pixel P2 such that the green light generated by the green color conversion layer 352 proceeds toward the G pixel P2 without luminance reduction. Here, the adhesive layer 360 is formed to not overlap the R pixel P1 such that the red light obtained by the red color conversion layer 354 proceeds toward the R pixel P1 without luminance reduction. That is, the adhesive layer 360 is formed to overlap a B pixel P3 as shown in FIG. 10.

The display panel 100 includes the lower polarizing plate 140, the upper polarizing plate 150, and the plurality of pixels P1, P2, and P3.

The lower polarizing plate 140 is disposed on a bottom surface of the lower substrate 110 and transmits light as linear polarized light. The upper polarizing plate 150 is disposed on a top surface of the upper substrate 120 such that transmission axes of the upper polarizing plate 150 and the lower polarizing plate 140 intersect or cross each other. The upper polarizing plate 150 transmits light as linear polarized light.

The plurality of pixels P1, P2, and P3 are formed between the lower substrate 110 and the upper substrate 120 and include the R pixel P1 which includes a red color filter, the G pixel P2 which includes a green color filter, and the B pixel P3 which includes a blue color filter.

In the R pixel P1, as the magenta light generated by the red color conversion layer 354 passes through the red color filter, blue light is absorbed and red light is emitted. In the G pixel P2, as the cyan light generated by the green color conversion layer 352 passes through the green color filter, the blue light is absorbed and the green light is emitted. In the B pixel P3, the blue light which is incident from the light guide plate 330 directly passes through the blue color filter and is emitted.

In the liquid crystal display device according to the sixth embodiment of the present disclosure, the light sources 310 emits blue light, whereas red light is generated by the red color conversion layer 354, and green light is generated by the green color conversion layer 352. That is, since red light and green light are spatially separated, the liquid crystal display device prevents the red light emitting material from absorbing the green light. Accordingly, in the liquid crystal display device according to the sixth embodiment of the present disclosure, the green light increases and a half width of a green peak increases as shown in FIG. 12 such that luminance of light may be expected to increase.

Also, the liquid crystal display device according to the sixth embodiment of the present disclosure may prevent a light-condensing function of the prism sheet 372 from being degraded by a scattering property caused by the green light emitting material or the red light emitting material of the color conversion layer 350 by forming the air gap A between the color conversion layer 350 and the prism sheet 372.

In addition, although it is assumed in FIG. 10 that the liquid crystal display device includes an edge light type backlight unit, the present disclosure is not limited thereto. In other embodiments, a liquid crystal display device may include a direct light type backlight unit. In this case, light sources of the liquid crystal display device may be arranged below a color conversion layer.

Seventh Embodiment

Figure 11:
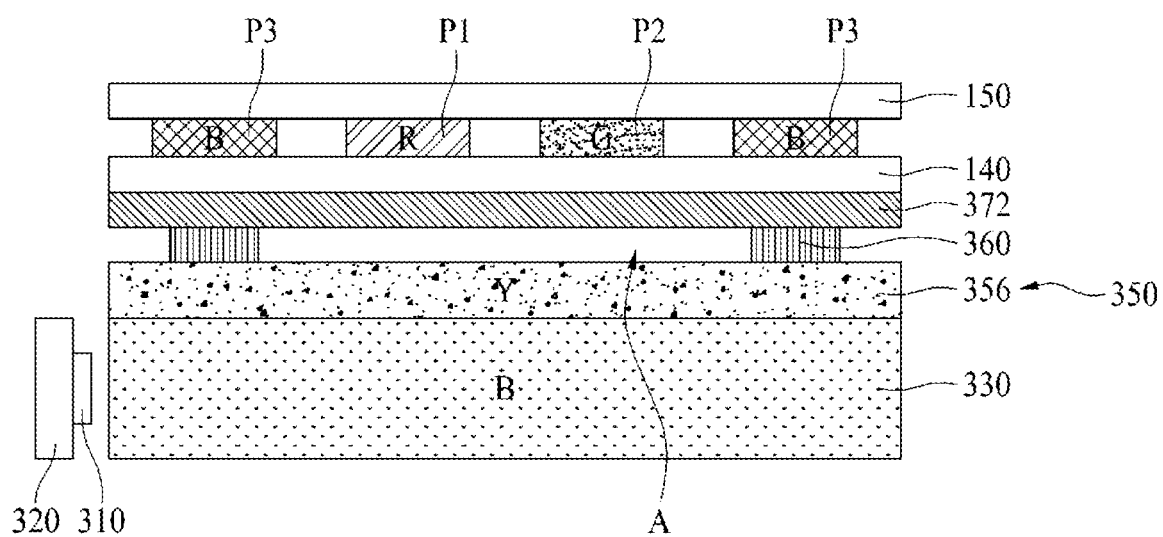
FIG. 11 is a schematic cross-sectional view showing a color conversion layer and an adhesive layer according to a seventh embodiment of the present disclosure.

FIG. 11 is a schematic cross-sectional view illustrating a seventh embodiment of the color conversion layer and the adhesive layer.

Referring to FIG. 11, a liquid crystal display device includes the display panel 100 and the backlight unit 300.

The backlight unit 300 includes the light sources 310, the light guide plate 330, a yellow color conversion layer 356, the adhesive layer 360, and the prism sheet 372.

The light sources 310 may include blue LEDs which emit blue light. The light sources 310 are arranged on at least one side surface of the light guide plate 330 and emit light toward the side surface of the light guide plate 330.

The light guide plate 330 converts light emitted from the light sources 310 into a surface light source and emits the light toward the display panel 100. In the seventh embodiment of the present disclosure, on the light guide plate 330, the blue light may be incident from the blue LED. Accordingly, the light guide plate 330 allows the blue light to proceed toward the display panel 100.

The yellow color conversion layer 356 is formed on the light guide plate 330 to overlap a plurality of pixels P1, P2, and P3. The yellow color conversion layer 356 is disposed on a path of light which proceeds toward the display panel 100 from the light guide plate 330 and converts the blue light emitted by the light guide plate 330 into white light. In more detail, the yellow color conversion layer 356 includes a yellow light emitting material. The yellow light emitting material included in the yellow color conversion layer 356 collides with a part of the blue light and absorbs energy of the blue light. Accordingly, a wavelength of the part of the blue light is changed into that of yellow light, and blue light and yellow light which have passed through the yellow color conversion layer 356 are mixed with each other and converted into white light.

The above-described yellow light emitting material includes, for example, a yellow phosphorescent material or a yellow fluorescent material and is mixed with a transparent resin material such as a silicone resin to form the yellow color conversion layer 356.

The prism sheet 372 condenses white light, which is incident thereon, in a first direction. Here, the first direction may correspond to a major axis direction or a minor axis direction of the light guide plate 330.

The adhesive layer 360 is disposed between the yellow color conversion layer 356 and the prism sheet 372. The adhesive layer 360 is formed on a part of a top surface of the yellow color conversion layer 356 so as to allow the prism sheet 372 to adhere to the yellow color conversion layer 356 simultaneously while forming an air gap A between the yellow color conversion layer 356 and the prism sheet 372. Here, the adhesive layer 360 is formed to not overlap a G pixel P2 and an R pixel P1 such that the yellow light generated by the yellow color conversion layer 356 proceeds toward the G pixel P2 and the R pixel P1 without luminance reduction. That is, the adhesive layer 360 is formed to overlap a B pixel P3 as shown in FIG. 11.

The display panel 100 includes the lower polarizing plate 140, the upper polarizing plate 150, and the plurality of pixels P1, P2, and P3.

The lower polarizing plate 140 is disposed on a bottom surface of the lower substrate 110 and transmits light as linear polarized light. The upper polarizing plate 150 is disposed on a top surface of the upper substrate 120 such that transmission axes of the upper polarizing plate 150 and the lower polarizing plate 140 intersect or cross each other. The upper polarizing plate 150 transmits light as linear polarized light.

The plurality of pixels P1, P2, and P3 are formed between the lower substrate 110 and the upper substrate 120 and include the R pixel P1 which includes a red color filter, the G pixel P2 which includes a green color filter, and the B pixel P3 which includes a blue color filter.

In the R pixel P1, as the white light generated by the yellow color conversion layer 356 passes through the red color filter, blue light and green light are absorbed and red light is emitted. In the G pixel P2, as the white light generated by the yellow color conversion layer 356 passes through the green color filter, blue light and red light are absorbed and green light is emitted. In the B pixel P3, as the white light generated by the yellow color conversion layer 356 passes through the blue color filter, red light and green light are absorbed and blue light is emitted.

In the liquid crystal display device according to the seventh embodiment of the present disclosure, blue light is emitted by the light sources 310 and yellow light is generated by the yellow color conversion layer 356. That is, the liquid crystal display device may prevent a red light emitting material from absorbing green light by generating yellow light using the yellow light emitting material. Accordingly, in the liquid crystal display device according to the seventh embodiment of the present disclosure, the green light increases and a half width of a green peak increases as shown in FIG. 12 such that luminance of light may be expected to increase.

Also, the liquid crystal display device according to the seventh embodiment of the present disclosure may prevent a light-condensing function of the prism sheet 372 from being degraded by a scattering property caused by the yellow light emitting material of the yellow color conversion layer 356 by forming the air gap A between the yellow color conversion layer 356 and the prism sheet 372.

In addition, although it is assumed in FIG. 11 that the liquid crystal display device includes an edge light type backlight unit, the present disclosure is not limited thereto. In other embodiments, a liquid crystal display device may include a direct light type backlight unit. In this case, light sources of the liquid crystal display device may be arranged below a yellow color conversion layer.

Figure 13A:
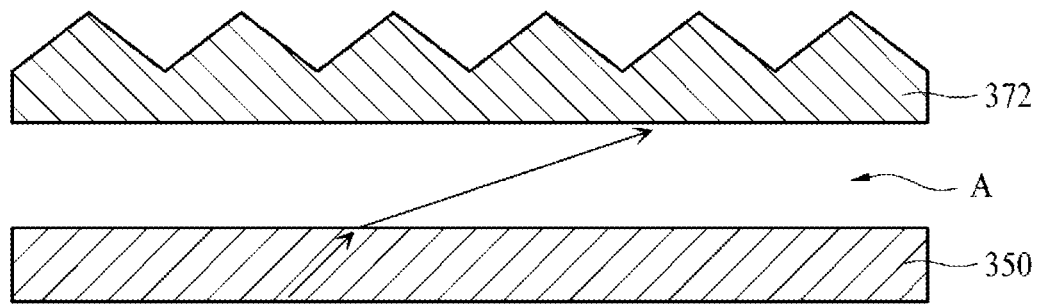
FIGS. 13A and 13B are views illustrating refraction of light depending on whether an air gap is present.
Figure 13B:
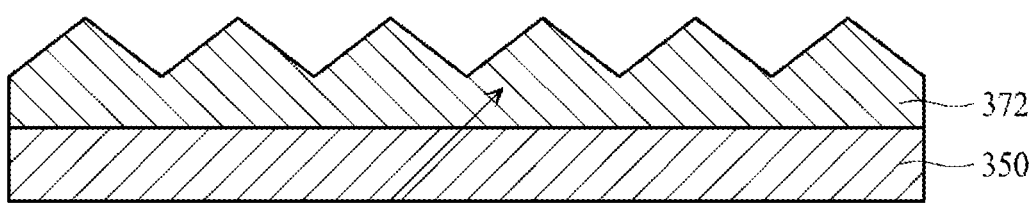
Figure 14A:
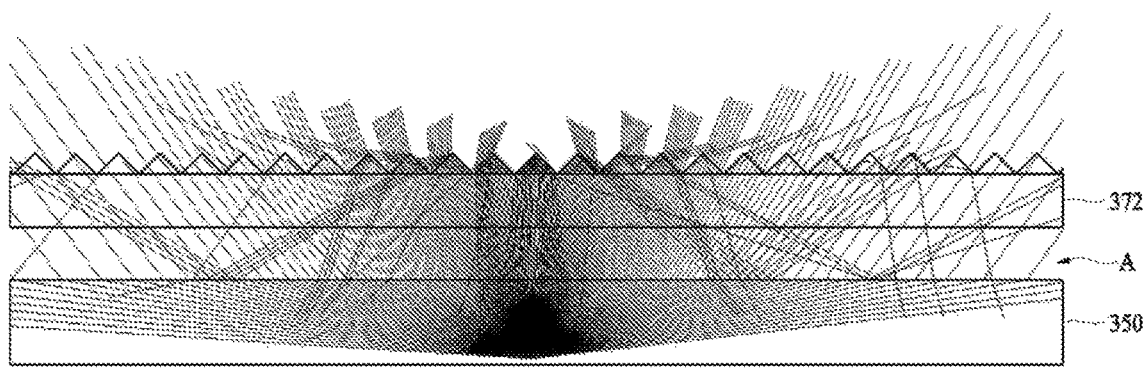
FIGS. 14A and 14B are views illustrating optical paths depending on whether an air gap is present or not.
Figure 14B:
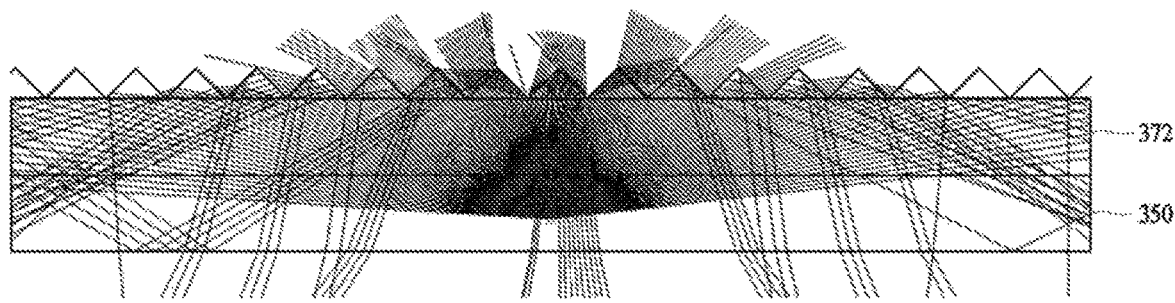

FIGS. 13A and 13B are views illustrating refraction of light depending on whether an air gap is present, and FIGS. 14A and 14B are views illustrating optical paths depending on whether an air gap is present or not.

FIG. 13A illustrates refraction of light when the air gap A is present between the color conversion layer 350 and the prism sheet 372. The light emitted by the color conversion layer 350 is refracted at a boundary between the color conversion layer 350 and the air gap A according to Snell's law. Accordingly, light, which is incident on the prism sheet 372 from the air gap A, has less light with a beam spread angle of 90 degrees than that of in a case when the air gap A is not present.

FIG. 13B illustrates refraction of light when the air gap A is not present between the color conversion layer 350 and the prism sheet 372. Since the light emitted by the color conversion layer 350 is output by a light emitting material in a full range, the light with the beam spread angle of 90 degrees is more than the case in which the air gap A is present.

Due to the above-described difference, luminance of light in a case when the air gap A is present between the color conversion layer 350 and the prism sheet 372 differs from that in a case when the air gap A is not present therebetween.

Referring to FIG. 14A, it may be seen that when the air gap A is present between the color conversion layer 350 and the prism sheet 372, less light is incident on and totally reflected by the prism sheet 372 at an angle of 90 degrees and most light is emitted toward the display panel.

On the other hand, referring to FIG. 14B, it may be seen that when the air gap A is not present between the color conversion layer 350 and the prism sheet 372, more light is incident on the prism sheet 372 at an angle of 90 degrees and most light fails to be emitted toward the display panel and is incident on the color conversion layer 350 again.

Figures 15, 16:
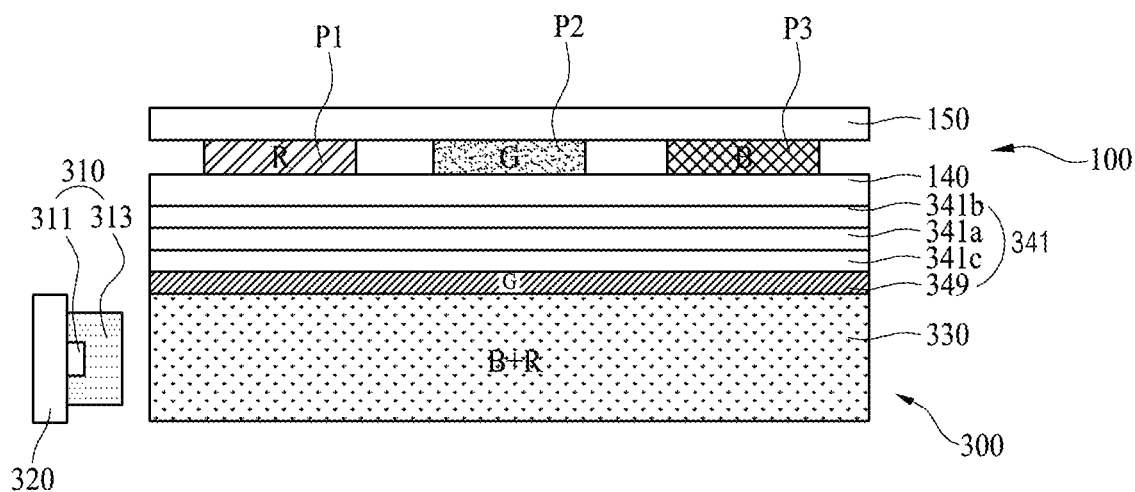
FIG. 15 is a view illustrating a difference in luminance depending on whether an air gap is present.
FIG. 16 is a schematic cross-sectional view showing a liquid crystal display device including a color conversion layer according to an eighth embodiment of the present disclosure.

As a result, according to the embodiment of the present disclosure, as the air gap A is formed between the color conversion layer 350 and the prism sheet 372, in comparison to a configuration in which the color conversion layer 350 and the prism sheet 372 are simply attached to each other without the air gap A therebetween, light increases such that luminance may be improved as shown in FIG. 15.

Eighth Embodiment

FIG. 16 is a schematic cross-sectional view illustrating an eighth embodiment of the liquid crystal display device including the color conversion layer.

Referring to FIG. 16, the liquid crystal display device includes the display panel 100 and the backlight unit 300.

Here, the display panel 100 may include one of a liquid crystal display (LCD) device, a plasma display panel (PDP), a field emission display (FED), an electroluminescence display (ELD), and an organic LED (OLED). Since an LCD typically does not have its own light emitting element, an additional light source is used.

Accordingly, the backlight unit 300 which includes a light source on a rear surface is provided and emits light toward a front surface of the display panel 100 formed of an LCD such that a recognizable image is embodied therethrough.

Although not shown in the drawing, in detail, the display panel 100 formed of an LCD includes the upper and lower substrates 110 and 120 (of FIG. 4) and a liquid crystal layer interposed between the two substrates 110 and 120. The backlight unit 300 is provided therebehind.

Here, the lower substrate 110 includes a plurality of gate lines, which are formed on an inside of the lower substrate 110, to be spaced at certain intervals apart in parallel; and data lines, which overlap with the gate lines, to form pixel areas. A TFT is formed at each of intersections of pixels P1, P2, and P3 where the gate lines and the data line overlap each other. In each pixel area, a plurality of pixel electrodes are connected to the TFT through drain contact holes and include a transparent conductive material.

The TFT includes a gate electrode, a gate insulator film, a semiconductor layer, and source and drain electrodes.

Here, the pixel electrode includes a plurality of bars separated and spaced apart and is formed in each of the pixels P1, P2, and P3. Also, a common line is formed to be flush with and parallel to the gate line, and a plurality of common electrodes, which are electrically connected to the common line and alternately spaced apart from the plurality of pixel electrodes separated in the pixels P1, P2, and P3, are formed.

Here, as another example, the pixel electrode may have a plate shape and be formed for each of the pixels P1, P2, and P3. Here, a part of the pixel electrode may be configured to overlap the gate line so as to form a storage capacitor.

Also, when the plurality of pixel electrodes and the common electrodes are formed to be spaced apart in each of the pixels P1, P2, and P3, the lower substrate 110 which operates in an IPS mode is formed. When the pixel electrode having a plate shape is formed on the lower substrate 110 without the common electrode, the lower substrate 110 which operates in any one of a TN mode, an ECB mode, and a VA mode is formed.

Also, on an inner surface of the upper substrate 120 which faces the lower substrate 110, color filters having colors, for example, R, G, and B corresponding to the pixels P1, P2, and P3 and a black matrix, which surrounds each of them and hides non-display elements such as the gate line, the data line, the TFT, and the like, are provided.

That is, there are included an R pixel P1 which includes a red color filter, a G pixel P2 which includes a green color filter, and a B pixel P3 which includes a blue color filter.

Here, the red color filter includes red color which transmits light having a red wavelength and absorbs light having other wavelengths. Also, the green color filter includes green color which transmits light having a green wavelength and absorbs light having other wavelengths. The blue color filter includes blue color which transmits light having a blue wavelength and absorbs light having other wavelengths.

The upper polarizing plate 150 is attached to the upper substrate 120 of the display panel 100, and the lower polarizing plate 140 is attached to the lower substrate 110.

A light transmission axis of the upper polarizing plate 150 intersects with or crosses a light transmission axis of the lower polarizing plate 140.

Also, alignment films for setting a pre-tilt angle of liquid crystals may be formed on inner surfaces of the upper substrate 120 and the lower substrate 110 which are in contact with the liquid crystals.

Also, the backlight unit 300 which supplies light to the display panel 100 is provided such that the backlight unit 300 refracts light of a light source which is emitted from one surface behind the lower substrate 110 toward the light guide plate 330 to allow the light to be incident on the display panel 100.

The backlight unit 300 includes the light sources 310 formed of a plurality of light emitting diodes (hereinafter, referred to as LEDs), the light guide plate 330, and an integrated optical sheet 341 above the light guide plate 330.

Here, the plurality of LEDs 310 are mounted on LED PCBs 320 and form an LED assembly. The LED assembly is fixed using a method, such as adhesion and the like such that light, which is emitted from each of the plurality of LEDs 310, faces an incident surface of the light guide plate 330.

Accordingly, light emitted from each of the LEDs 310 is incident on the incident surface of the light guide plate 330, is refracted therein toward the display panel 100, is treated as a high-quality surface light source while passing through the integrated optical sheet 341 with the light reflected by the reflection sheet 340 (of FIG. 4), and is supplied to the display panel 100.

Here, each of the plurality of LEDs 310 is formed as a magenta LED which includes a blue LED chip 311, which emits blue light, and a red fluorescent body 313 which is applied to a top of the blue LED chip 311.

That is, the blue light emitted by the blue LED chip 311 is mixed with red light emitted by the red fluorescent body 313 such that magenta light exits outward.

The light guide plate 330 converts light emitted from the light sources 310 into a surface light source and emits the light toward the display panel 100. On the light guide plate 330, magenta light, in which blue light and red light are mixed, is incident. Accordingly, the light guide plate 330 allows the magenta light to proceed toward the display panel 100.

Here, in the liquid crystal display device according to the eighth embodiment of the present disclosure, the integrated optical sheet 341 is located above the light guide plate 330. The integrated optical sheet 341 includes a green color conversion layer 349, first and second light condensing portions 341a and 341b, and a diffusion portion 341c. The first and second light condensing portions 341a and 341b and the diffusion 341c of the integrated optical sheet 341 of FIG. 16 may correspond to the optical sheets 370 of FIG. 4. The integrated optical sheet 341 is attached to an outer surface of the lower polarizing plate 140 through a light diffusing adhesive 351 (of FIG. 17).

Accordingly, the magenta light which is emitted by the light guide plate 330 is converted through the green color conversion layer 349. Also, white light which passes through the green color conversion layer 349 is diffused and condensed through the diffusion portion 341c and the first and second light condensing portions 341a and 341b to be treated as a high-quality surface light source and provided to the display panel 100.

Particularly, higher luminance may also be embodied since the integrated optical sheet 341 according to the embodiment of the present disclosure may recycle light through the first and second light condensing portions 341a and 341b.

This will be described below in detail.

Accordingly, in the liquid crystal display device according to the eighth embodiment of the present disclosure, in the R pixel P1, as the white light generated by the green color conversion layer 349 of the integrated optical sheet 341 passes through the red color filter, blue light and green light are absorbed and red light is emitted.

Also, in the G pixel P2, as the white light generated by the green color conversion layer 349 passes through the green color filter, blue light and red light are absorbed and green light is emitted. In the B pixel P3, as the white light generated by the green color conversion layer 349 passes through the blue color filter, red light and green light are absorbed and blue light is emitted.

In the liquid crystal display device according to the eighth embodiment of the present disclosure, the magenta light is emitted by the light sources 310 and the green light is generated by the green color conversion layer 349 of the integrated optical sheet 341. That is, since the red light and the green light are spatially separated and the red light is generated first and then the green light is generated, the liquid crystal display device prevents a red light emitting material from absorbing the green light.

Accordingly, in the liquid crystal display device according to the eighth embodiment of the present disclosure, the green light increases and a half width of a green peak increases as shown in FIG. 12 such that luminance of light may be expected to increase.

Figure 17:
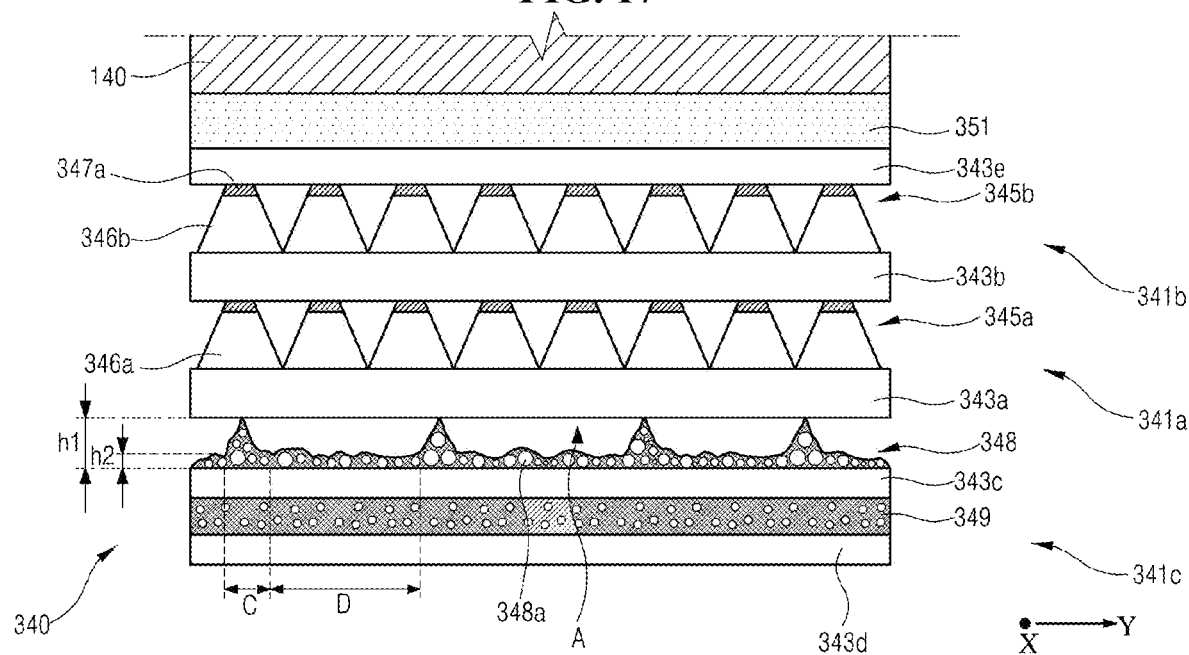
FIG. 17 is a schematic cross-sectional view illustrating a state in which an optical mixture sheet of FIG. 16 is attached to an outer surface of a lower polarizing plate.

FIG. 17 is a schematic cross-sectional view illustrating a state in which the optical mixture sheet of FIG. 16 is attached to the outer surface of the lower polarizing plate.

As shown in the drawing, the integrated optical sheet 341 largely includes the first light condensing portion 341a, the second light condensing portion 341b, the diffusion portion 341c, and the green color conversion layer 349.

The first light condensing portion 341a includes a first support layer 343a and a first lens layer 345a for condensing light at a top surface of the first support layer 343a. The second light condensing portion 341b located above the first light condensing portion 341a includes a second support layer 343b and a second lens layer 345b for condensing light at a top surface of the second support layer 343b.

Also, the diffusion portion 341c includes a third support layer 343c and a diffusion layer 348 on a top surface of the third support layer 343c. The green color conversion layer 349 is located below the diffusion layer 348, that is, the green color conversion layer 349 is located below the diffusion portion 341c.

Here, in detail, the first and second support layers 343a and 343b of the first and second light condensing portions 341a and 341b include, for example, polycarbonate, polysulfone, polyacrylate, polystyrene, polyvinyl chloride, polyvinyl alcohol, poly norbornene, polyester, and the like, which are capable of transmitting light.

Also, the first and second lens layers 345a and 345b formed above the first and second support layers 343a and 343b, respectively, are formed of transparent acrylic resins which are adjacently arranged in a strip shape along a longitudinal direction of the integrated optical sheet 341 such that a plurality of first and second light condensing patterns 346a and 346b form a line in a shape in which a ridge and a valley are repeated and protrude from the first and second support layers 343a and 343b, respectively.

Due to the first and second light condensing patterns 346a and 346b, the integrated optical sheet 341 condenses light at the display panel 100 of FIG. 16, which is located above the integrated optical sheet 341, such that an effect of improving luminance is provided.

Here, the first and second light condensing patterns 346a and 346b have trapezoidal column shapes, in which corners of prism bars are cut to have flat top surfaces and cross sections thereof have trapezoidal shapes, having widths which become narrower as a distance from the first and second support layers 343a and 343b increases.

In this case, reflection patterns 347a are provided at top surfaces of the first and second light condensing patterns 346a and 346b.

Corresponding to the first and second light condensing patterns 346a and 346b having trapezoidal cross sections, the reflection patterns 347a reflect light which is lost by the top surfaces of the first and second light condensing patterns 346a and 346b such that a loss of light is minimized by recycling the light.

Accordingly, luminance is improved more.

In addition, although the cross sections of the first and second light condensing patterns 346a and 346b of the first and second lens layers 345a and 345b are shown as the same such that longitudinal directions of the first and second lens layers 345a and 345b are illustrated as the same direction in the drawings, the longitudinal directions of the first and second lens layers 345a and 345b, which protrude and are arranged to form a line along the longitudinal direction of the integrated optical sheet 341, may be also perpendicular to each other such that pitch moiré which is generated between optical patterns is prevented, and luminance is also improved.

That is, while the first lens layers 345a protrude and are arranged to form a line in an X-axis direction defined in the drawing, the second lens layers 345b protrude and are arranged to form a line in a Y-axis direction perpendicular to the X-axis direction, wherein the X-axis direction is defined in the drawing as the longitudinal direction of the first lens layer 345a, and the Y-axis direction is defined in the drawing as the longitudinal direction of the second lens layer 345b.

Also, the diffusion portion 341c is located below the first and second light condensing portions 341a and 341b. That is, the diffusion portion 341c diffuses magenta light which exits from the light guide plate 330 (of FIG. 16) such that the magenta light is uniformly distributed in a wide range.

The diffusion portion 341c includes the third support layer 343c and the diffusion layer 348 located above the third support layer 343c. The third support layer 343c includes, for example, polycarbonate, polysulfone, polyacrylate, polystyrene, polyvinyl chloride, polyvinyl alcohol, polynorbornene, polyester, and the like, which are capable of transmitting light.

Also, the diffusion layer 348 includes beads 348a which are optical diffusion components in a binder resin. The beads 348a may scatter light which is incident on the diffusion layer 348 so as to prevent the light from being partially concentrated.

As an example, an acrylic resin, a urethane resin, an epoxy resin, a vinyl resin, a polyester resin, a polyamide resin, and the like which have high transparency, excellent light transmittance, and easily-adjusted viscosity, may be used as the binder resin.

Through this, the diffusion layer 348 refracts and scatters light which is incident to diffuse the light and allows nonuniform light which has passed through the light guide plate 330 to exit as uniform light.

Here, the beads 348a included in the binder resin of the diffusion layer 348 may have a variety of sizes and spreading of the beads 348a above the third support layer 343c may be adjusted such that the diffusion layer 348 may have different heights.

That is, the spreading of the beads 348a is adjusted such that the diffusion layer 348 has a first height h1 in a first area C which is shown in FIG. 17. The spreading of the beads 348a is adjusted such that the diffusion layer 348 has a second height h2 which is lower than the first height h1 in a second area D.

The diffusion layer 348, which is located in the first area C and has the first height h1, comes into contact with a bottom surface of the first support layer 343a of the first light condensing portion 341a. The diffusion layer 348, which is located in the second area D and has the second height h2, is spaced at a certain distance apart from the bottom surface of the first support layer 343a of the first light condensing portion 341a and forms the air gap A.

The air gap A formed between the diffusion layer 348 and the first support layer 343a prevents a light-condensing function of the first and second light condensing portions 341a and 341b of the integrated optical sheet 341 from being degraded by a scattering property of the green light emitting material of the green color conversion layer 349.

That is, luminance of light differs depending on whether the air gap A is present between the green color conversion layer 349 and the first and second light condensing portions 341a and 341b. When the air gap A is present between the green color conversion layer 349 and the first and second light condensing portions 341a and 341b, less light is incident on and totally reflected by the first and second light condensing portions 341a and 341b at an angle of 90 degrees, and most light exits toward the display panel 100 (of FIG. 16).

On the other hand, when the air gap A is not present between the green color conversion layer 349 and the first and second light condensing portions 341a and 341b, more light is incident on and totally reflected by the first and second light condensing portions 341a and 341b at an angle of 90 degrees, and most light fails to exit toward the display panel 100 and is incident on the green color conversion layer 349 again.

In other words, it may be seen that when the air gap A is formed between the green color conversion layer 349 and the first and second light condensing portions 341a and 341b, in comparison to a configuration in which the green color conversion layer 349 and the first and second light condensing portions 341a and 341b are simply attached to each other without the air gap A therebetween, a quantity of light increases such that brightness may be improved.

Also, the green color conversion layer 349 is located below the third support layer 343c of the diffusion portion 341c. The green color conversion layer 349 includes a green light emitting material. The green light emitting material includes, for example, a green phosphorescent material or a green fluorescent material and is mixed with a transparent resin material to form the green color conversion layer 349.

The green light emitting material included in the green color conversion layer 349 collides with a part of the blue light included in the magenta light and absorbs energy of the blue light. Accordingly, a wavelength of the part of the blue light is changed into that of green light, and blue light, red light and green light which have passed through the green color conversion layer 349 are mixed with each other and converted into white.

A fourth support layer 343d is provided outside the green color conversion layer 349 such that the third support layer 343c and the fourth support layer 343d of the diffusion portion 341c protect and support the green color conversion layer 349.

The first and second light condensing portions 341a and 341b, the diffusion portion 341c, and the green color conversion layer 349 are all integrated and laminated with one another. To this end, the diffusion layer 348 of the diffusion portion 341c and the first light condensing pattern 346a of the first lens layer 345a of the first light condensing portion 341a have viscosity.

Accordingly, the first light condensing portion 341a and the second light condensing portion 341b are integrated and laminated with each other through the viscosity of the first lens layer 345a of the first light condensing portion 341a. The first light condensing portion 341a and the diffusion portion 341c are integrated and laminated with each other through viscosity of the diffusion layer 348 of the diffusion portion 341c which has the first height h1.

Here, the green color conversion layer 349 is applied to and covers an outside of the third support layer 343c of the diffusion portion 341c and is supported and protected with the fourth support layer 343d such that the green color conversion layer 349 is integrated and laminated with the diffusion portion 341c.

That is, the first and second light condensing portions 341a and 341b, the diffusion portion 341c, and the green color conversion layer 349 are all integrated and laminated with one another.

As described above, the liquid crystal display device according to the eighth embodiment of the present disclosure includes the integrated optical sheet 341 above the light guide plate 330 (of FIG. 16) so as to prevent light efficiency from being degraded by a plurality of optical sheets such that a liquid crystal display device having improved light efficiency may be provided and a backlight unit may have a reduced thickness in comparison to a general liquid crystal display device which includes a plurality of optical sheets.

Through this, a light-weight and thin liquid crystal display device may be provided. Also, as the number of components is reduced, a modulation process may be simplified and an assembling time and material cost may be reduced so as to improve process efficiency.

Also, in the liquid crystal display device according to the eighth embodiment of the present disclosure, the integrated optical sheet 341 is attached to an outside of the lower polarizing plate 140 of the display panel 100 through the light diffusing adhesive 351 such that a light-weight and thin liquid crystal display device may be embodied and a modulation process may be further simplified so as to further improve process efficiency.

Here, the light diffusing adhesive 351 is located above the second lens layer 345b of the second light condensing portion 341b to attach and fix the integrated optical sheet 341 to the outside of the lower polarizing plate 140. To improve a fixing force of the integrated optical sheet 341, a fifth support layer 343e may be further located above the second lens layer 345b.

The fifth support layer 343e increases an area in which the integrated optical sheet 341 and the light diffusing adhesive 351 adhere to each other so as to increase the fixing force and protects the second light condensing pattern 346b of the second lens layer 345b.

The fifth support layer 343e includes, for example, polycarbonate, polysulfone, polyacrylate, polystyrene, polyvinyl chloride, polyvinyl alcohol, poly norbornene, polyester, and the like, which are capable of transmitting light.

As described above, in the liquid crystal display device according to the eighth embodiment of the present disclosure, the LED 310 (of FIG. 16) of the backlight unit 300 (of FIG. 16) is allowed to emit magenta light, and the integrated optical sheet 341 including the green color conversion layer 349 is located above the light guide plate 330 (of FIG. 16) such that green light and red light are spatially separated so as to improve luminance of light.

Also, the diffusion layer 348 of the integrated optical sheet 341 is configured to have the first height h1 and the second height h2, and the air gap A is formed between the diffusion portion 341c and the first light condensing portion 341a such that a light condensing function of the first and second light condensing portions 341a and 341b may be prevented from being degraded by a scattering property caused by the green light emitting material of the green color conversion layer 349. Accordingly, luminance may be improved.

Also, since the integrated optical sheet 341, which includes the first and second light condensing portions 341a and 341b and the diffusion portion 341c, is provided above the light guide plate 330 (of FIG. 16) such that it is possible to prevent light efficiency from being degraded by a plurality of optical sheets, a liquid crystal display device having improved light efficiency may be provided and a thickness of a backlight unit may also be reduced in comparison to a general liquid crystal display device including a plurality of optical sheets.

Through this, a light-weight and thin liquid crystal display device may be provided. Also, as the number of components is reduced, a modulation process may be simplified and an assembling time and material cost may be reduced so as to improve process efficiency.

Particularly, since the integrated optical sheet 341 according to the embodiment of the present disclosure may recycle light through the first and second light condensing portions 341a and 341b, higher luminance may also be embodied.

Also, since the integrated optical sheet 341 is attached to the outside of the lower polarizing plate 140 of the display panel 100 through the light diffusing adhesive 351, a light-weight and thin liquid crystal display device may be embodied and a modulation process may be further simplified so as to further improve process efficiency.

Figure 18A:
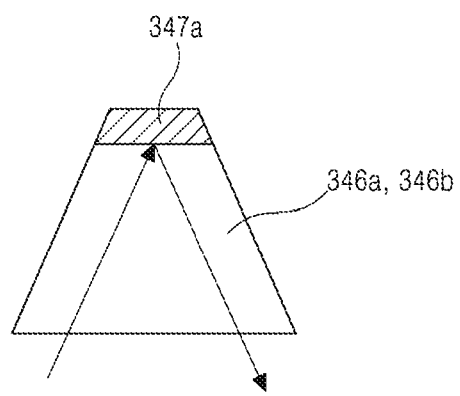
FIGS. 18A and 18B are schematic diagrams illustrating parts of first and second light condensing patterns of the present disclosure of FIG. 17.
Figure 18B:
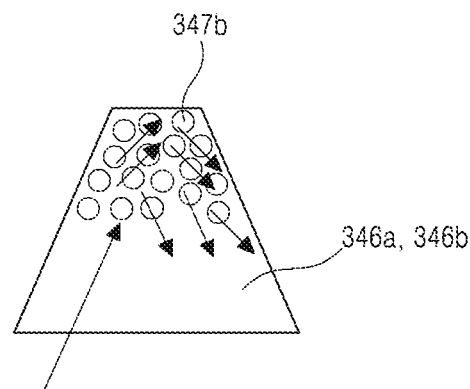

FIGS. 18A and 18B are schematic diagrams illustrating parts of the first and second light condensing patterns of the present disclosure of FIG. 17.

As shown in the drawings, the light condensing patterns 346a and 346b have trapezoidal column shapes, in which corners of prisms are cut to have flat top surface and cross sections have trapezoidal shapes, having widths which become narrower as a distance from the support layers 343a and 343b (of FIG. 17) increases.

Here, as shown in FIG. 18A, the reflection patterns 347a are provided at top surfaces of the first and second light condensing patterns 346a and 346b.

The reflection patterns 347a are formed by applying or forming a layer of any one of titanium dioxide, aluminum, aluminum oxide, barium sulfate, calcium carbonate, calcium sulfate, magnesium sulfate, barium carbonate, zinc oxide, magnesium hydroxide, calcium hydroxide, and talc to the top surfaces of the light condensing patterns 346a and 346b.

As the light condensing patterns 346a and 346b have trapezoidal cross sections, the reflection patterns 347a reflect light which is lost by the top surfaces of the light condensing patterns 346a and 346b such that a loss of light is minimized by recycling the light.

That is, the light condensing patterns 346a and 346b have a highest luminance improvement effect when cross sections have prism shapes. When the corners of the prisms are cut and cross sections have trapezoidal shapes like the light condensing patterns 346a and 346b of the present disclosure, part of light, which is incident on the light condensing patterns 346a and 346b, is lost by the top surfaces of the light condensing patterns 346a and 346b.

Here, the liquid crystal display device according to the eighth embodiment of the present disclosure includes the reflection patterns 347a on the top surfaces of the light condensing patterns 346a and 346b to reflect light which is lost by the top surfaces of the light condensing patterns 346a and 346b by using the reflection patterns 347a such that a loss of the light is minimized by recycling the light. Accordingly, luminance is further improved.

Otherwise, as shown in FIG. 18B, the light condensing patterns 346a and 346b may be configured to include halo beads 347b. The halo beads 347b are hollow and located to be adjacent to the top surfaces of the light condensing patterns 346a and 346b.

The halo beads 347b allow the light which is lost by the top surfaces of the light condensing patterns 346a and 346b to scatter therein such that the loss of light is minimized by recycling the light. Accordingly, luminance is further improved.

Although the case in which the LED is a magenta LED and the color conversion layer is a green color conversion is described by a way of example in the eighth embodiment of the present disclosure, the present disclosure is not limited thereto. For example, the combination of the LEDs and the color conversion layers in the first to seven embodiments may also be used.

Figure 19:
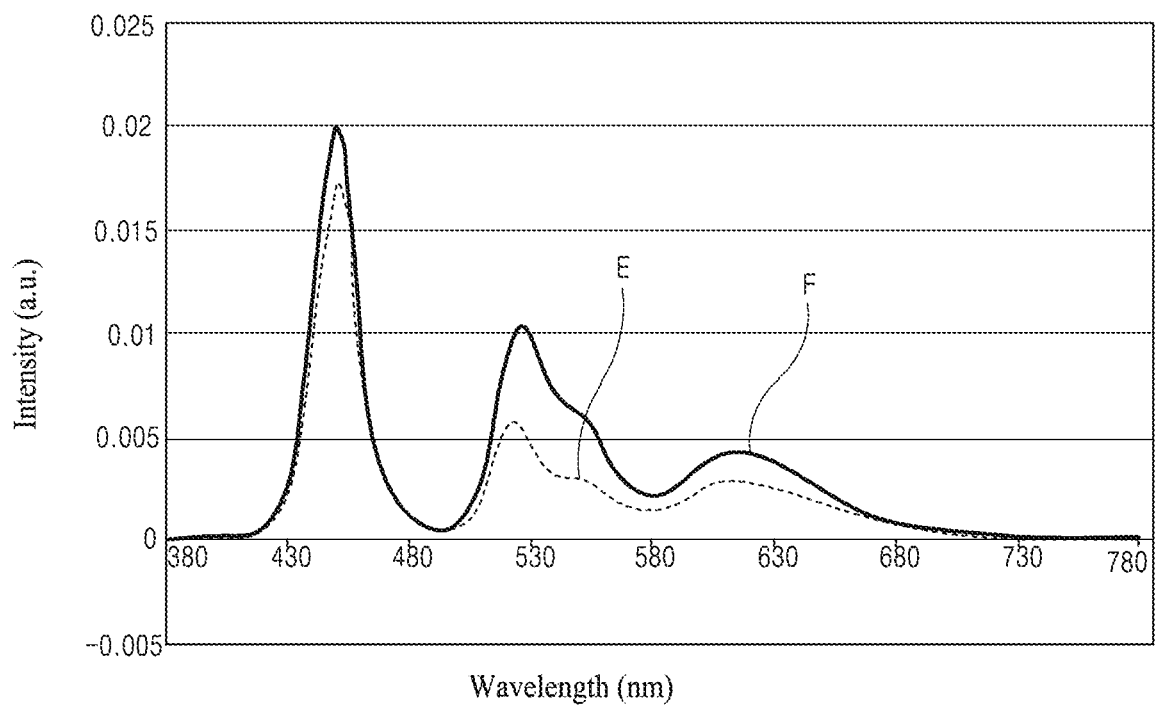
FIG. 19 is a graph illustrating an increase in luminance of a liquid crystal display device according to an eighth embodiment of the present disclosure.

FIG. 19 is a graph illustrating an increase in luminance of the liquid crystal display device according to the eighth embodiment of the present disclosure.

Before a description, it should be noted that E refers to the liquid crystal display device according to the first embodiment of the present disclosure and F refers to the liquid crystal display device according to the eighth embodiment of the present disclosure.

Referring to FIG. 19, it may be seen that F has luminance which is increased more than that of E.

In other words, it may be seen that the liquid crystal display device according to the eighth embodiment of the present disclosure, which includes the optical mixture sheet in which the first and second light condensing portions, the diffusion portion, and the green color conversion layer are integrally formed and the reflection patterns are provided in the light condensing patterns, has luminance which is increased more than the liquid crystal display device according to the first embodiment of the present disclosure, which does not include the optical mixture sheet. Also, it may be seen that the optical mixture sheet according to the eighth embodiment of the present disclosure increases luminance of the liquid crystal display device.

As described above, in the liquid crystal display device according to the eighth embodiment of the present disclosure, the LED 310 (of FIG. 16) of the backlight unit 300 (of FIG. 16) is allowed to emit magenta light, and the integrated optical sheet 341 including the green color conversion layer 349 is located above the light guide plate 330 (of FIG. 16) such that green light and red light are spatially separated so as to improve luminance of light.

Also, the diffusion layer 348 of the integrated optical sheet 341 is configured to have the first height h1 and the second height h2, and the air gap A is formed between the diffusion portion 341c and the first light condensing portion 341a such that a light condensing function of the first and second light condensing portions 341a and 341b may be prevented from being degraded by a scattering property caused by the green light emitting material of the green color conversion layer 349. Accordingly, luminance may be improved.

Also, since the integrated optical sheet 341, which includes the first and second light condensing portions 341a and 341b and the diffusion portion 341c, is provided above the light guide plate 330 (of FIG. 16) such that it is possible to prevent light efficiency from being degraded by a plurality of optical sheets, a liquid crystal display device having improved light efficiency may be provided and a thickness of a backlight unit may also be reduced in comparison to a general liquid crystal display device including a plurality of optical sheets.

Through this, a light-weight and thin liquid crystal display device may be provided. Also, as the number of components is reduced, a modulation process is simplified and an assembling time and material cost may be reduced so as to improve process efficiency.

Particularly, since the integrated optical sheet 341 of the present disclosure may recycle light through the first and second light condensing portions 341a and 341b, higher luminance may also be embodied.

Also, since the integrated optical sheet 341 is attached to the outside of the lower polarizing plate 140 of the display panel 100 through the light diffusing adhesive 351, a light-weight and thin liquid crystal display device may be embodied and a modulation process may be further simplified so as to further improve process efficiency.

As described above, according to the embodiments of the present disclosure, since a green color conversion layer which converts blue light into green light is additionally included, red color and green color may be spatially separated such that it is possible to prevent a red light emitting material from absorbing the green light as much as an area A in which a green light emitting area overlaps a red color absorption area. As a result, according to the embodiments, the green light increases such that luminance and color reproduction may be improved.

According to the embodiments, an air gap is formed between a color conversion layer and a prism sheet such that light which is perpendicularly incident on the prism sheet may be reduced. Accordingly, light which is incident on the prism sheet may be prevented from being totally reflected, and luminance may be increased by emitting most light toward a display panel.

According to the embodiments, since an adhesive layer is formed to not overlap a green pixel, the green light may be incident on the display panel without a loss such that light efficiency may be increased.

Although the embodiments of the present disclosure have been described above in more detail with reference to the attached drawings, the present disclosure is not limited to the above embodiments and a variety of modifications thereof may be made without departing from the technical concept of the present disclosure.

Accordingly, the embodiments disclosed herein are not intended to limit but explain the technical concept of the present disclosure, and the scope of the present disclosure should not be limited by the above embodiments.

Therefore, the above-described embodiments should be understood to be exemplary and not limiting in every aspect.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A liquid crystal display device, comprising:
a display panel including a red pixel, a green pixel, and a blue pixel; and
a backlight unit configured to emit light to the display panel, the backlight unit including:
a light source configured to output a first color light;
a color conversion layer configured to convert the first color light into a second color light;
an optical sheet configured to diffuse the second color light; and
an air gap between the color conversion layer and the optical sheet,
wherein the optical sheet includes:
a first light condensing portion including a first support layer and a first lens layer located above the first support layer;
a second light condensing portion including a second support layer and a second lens layer located above the second support layer; and
a diffusion portion located below the first light condensing portion, the diffusion portion including a third support layer and a diffusion layer located above the third support layer,
wherein the first and second lens layers include first and second light condensing patterns, the first and second light condensing patterns have trapezoidal column shapes having widths which become narrower as a distance from the first and second support layers increases, and the first and second light condensing patterns have trapezoidal cross sections and top surfaces, and
wherein reflection patterns are positioned on the top surfaces.

2. The liquid crystal display device of claim 1, wherein the first color light includes blue light, and the second color light includes green light.

3. The liquid crystal display device of claim 2, wherein the color conversion layer comprises a mixed color conversion layer including a red light emitting material, which converts the blue light into the red light, and a green light emitting material, which converts the blue light into the green light.

4. The liquid crystal display device of claim 2, wherein the color conversion layer includes:
a red color conversion layer overlapping the red pixel, the red color conversion layer including a red light emitting material configured to convert the blue light into red light; and
a green color conversion layer flush with the red color conversion layer and overlapping the green pixel, the green color conversion layer including a green light emitting material configured to convert the blue light into the green light.

5. The liquid crystal display device of claim 2, wherein the first color light further includes red light, and the color conversion layer includes a green color conversion layer configured to convert a part of the blue light into the green light.

6. The liquid crystal display device of claim 5, wherein the green color conversion layer overlaps the green pixel.

7. The liquid crystal display device of claim 5,
wherein the green color conversion layer is located below the third support layer.

8. The liquid crystal display device of claim 7, wherein the diffusion layer has a first height to come into contact with a bottom surface of the first support layer in a first area, and has a second height lower than the first height in a second area, and
wherein the air gap is between the bottom surface of the first support layer and the diffusion layer in the second area.

9. The liquid crystal display device of claim 7, further comprising:
a fourth support layer outside the green color conversion layer.

10. The liquid crystal display device of claim 7, further comprising:
a lower polarizing plate located below the display panel, the optical sheet adheres being adhered to the lower polarizing plate through a light diffusing adhesive.

11. The liquid crystal display device of claim 10, further comprising:
a fourth support layer between the second light condensing portion and the light diffusing adhesive.

12. The liquid crystal display device of claim 2, wherein the color conversion layer includes a yellow color conversion layer configured to convert a part of the blue light into yellow light.

13. The liquid crystal display device of claim 1, further comprising:
an adhesive layer disposed between the color conversion layer and the optical sheet to overlap the blue pixel.

14. A backlight unit, comprising:
a light source configured to output a first color light;
a color conversion layer configured to convert the first color light into a second color light, the first color light including blue light, and the second color light including green light;
an optical sheet configured to diffuse the second color light; and
an air gap between the color conversion layer and the optical sheet,
wherein the optical sheet includes:
a first light condensing portion including a first support layer and a first lens layer located above the first support layer;
a second light condensing portion including a second support layer and a second lens layer located above the second support layer; and
a diffusion portion located below the first light condensing portion, the diffusion portion including a third support layer and a diffusion layer located above the third support layer,
wherein the first and second lens layers include first and second light condensing patterns, the first and second light condensing patterns have trapezoidal column shapes having widths which become narrower as a distance from the first and second support layers increases, and the first and second light condensing patterns have trapezoidal cross sections and top surfaces, and
wherein reflection patterns are positioned on the top surfaces.

15. The backlight unit of claim 14, wherein the color conversion layer includes a mixed color conversion layer, the mixed color conversion layer includes a red light emitting material and a green light emitting material, the red light emitting material is configured to convert the blue light into red light, and the green light emitting material is configured to convert the blue light into the green light.

16. The backlight unit of claim 14, wherein the color conversion layer includes:
a red color conversion layer configured to convert a part of the blue light into red light; and
a green color conversion layer flush with the red color conversion layer, the green color conversion layer configured to convert another part of the blue light into the green light.

17. The backlight unit of claim 14, wherein the first color light further includes red light, and the color conversion layer includes a green color conversion layer configured to convert a part of the blue light into the green light.

* * * * *